(12) United States Patent
Lu et al.

(10) Patent No.: US 12,014,173 B2
(45) Date of Patent: *Jun. 18, 2024

(54) DATA PROCESSING METHOD FOR NETWORK ADAPTER AND NETWORK ADAPTER

(71) Applicant: Huawei Technologies Co., Ltd., Shenzhen (CN)

(72) Inventors: Shengwen Lu, Hangzhou (CN); Victor Gissin, Hod Hasharon (IL); Junying Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,874

(22) Filed: Dec. 7, 2022

(65) Prior Publication Data

US 2023/0106771 A1    Apr. 6, 2023

Related U.S. Application Data

(63) Continuation of application No. PCT/CN2021/091779, filed on Apr. 30, 2021.

(30) Foreign Application Priority Data

Jun. 9, 2020  (CN) .......................... 202010526778.1
Sep. 22, 2020 (CN) .......................... 202010999199.9

(51) Int. Cl.
*G06F 9/06*     (2006.01)
*G06F 3/06*     (2006.01)

(52) U.S. Cl.
CPC .............. *G06F 9/06* (2013.01); *G06F 3/0604* (2013.01)

(58) Field of Classification Search
CPC ................................ G06F 9/06; G06F 3/0604
See application file for complete search history.

(56) References Cited

U.S. PATENT DOCUMENTS

| 2011/0219208 | A1 | 9/2011 | Asaad et al. |
| 2011/0238888 | A1 | 9/2011 | Chiu et al. |
| 2013/0311434 | A1 | 11/2013 | Jones |

(Continued)

FOREIGN PATENT DOCUMENTS

| CN | 105068817 A | 11/2015 |
| CN | 105450588 A | 3/2016 |

(Continued)

*Primary Examiner* — Hua Fan
(74) *Attorney, Agent, or Firm* — Conley Rose, P.C.

(57) ABSTRACT

A data processing method for a network adapter includes the network adapter that obtains a first input/output (I/O) command. The first I/O command instructs to write data stored in a local server to at least one remote server, and the first I/O command includes address information and length information that are of the data and that are stored in the local server. The network adapter splits the data based on the address information and the length information to obtain a plurality of groups of address information and length information. The network adapter obtains, from the local server based on the groups of address information and length information, data corresponding to the groups of address information and length information, and sends the data to the at least one remote server.

20 Claims, 13 Drawing Sheets

(56) References Cited

U.S. PATENT DOCUMENTS

| | | | |
|---|---|---|---|
| 2016/0062954 A1* | 3/2016 | Ruff | G06F 40/205 |
| | | | 715/249 |
| 2016/0342545 A1 | 11/2016 | Arai et al. | |
| 2018/0067685 A1 | 3/2018 | Deng et al. | |
| 2018/0307650 A1 | 10/2018 | Kachare et al. | |
| 2019/0294366 A1 | 9/2019 | Kawamura et al. | |
| 2020/0328966 A1 | 10/2020 | Wang et al. | |
| 2020/0333944 A1 | 10/2020 | Guo | |
| 2021/0200681 A1 | 7/2021 | Gong et al. | |

FOREIGN PATENT DOCUMENTS

| | | |
|---|---|---|
| CN | 105808345 A | 7/2016 |
| CN | 106020731 A | 10/2016 |
| CN | 106210041 A | 12/2016 |
| CN | 106775434 A | 5/2017 |
| CN | 108768851 A | 11/2018 |
| CN | 109218308 A | 1/2019 |
| CN | 109597582 A | 4/2019 |
| CN | 109656855 A | 4/2019 |
| CN | 109962832 A | 7/2019 |
| CN | 110677402 A | 1/2020 |
| CN | 110896406 A | 3/2020 |
| JP | 2008102967 A | 5/2008 |
| JP | 2014153754 A | 8/2014 |
| JP | 2018185814 A | 11/2018 |
| JP | 2019164713 A | 9/2019 |
| WO | 2015121912 A1 | 8/2015 |

\* cited by examiner

DATA PROCESSING METHOD FOR NETWORK ADAPTER AND NETWORK ADAPTER

CROSS-REFERENCE TO RELATED APPLICATIONS

This application is a continuation application of International Patent Application No. PCT/CN2021/091779 filed on Apr. 30, 2021, which claims priority to Chinese Patent Application No. 202010526778.1 filed on Jun. 9, 2020 and Chinese Patent Application No. 202010999199.9 filed on Sep. 22, 2020. All of the aforementioned patent applications are hereby incorporated by reference in their entireties.

TECHNICAL FIELD

This application relates to the field of server technologies, and in particular, to a data processing method for a network adapter and a network adapter.

BACKGROUND

With the emergence of cloud computing, to reduce usage of a host processor (for example, a central processing unit (CPU)), provide more host CPUs for external sales, or provide better user experience, and prevent a CPU of a user from being affected by more background services of a host, services originally running on the host, for example, a management service, a storage service, and a network service, may be offloaded to a network adapter, and a CPU on the network adapter processes the foregoing services. In this way, the host CPU can almost be fully provided for the user for other uses.

The storage service is used as an example. In a related technical solution, for an input/output (I/O) write command, the network adapter needs to store to-be-written data in the host to a memory on the network adapter, and after a processor on the network adapter processes the data, the data is sent to a remote server. For an I/O read command, data is first read from the remote server to the memory on the network adapter, and then the data is written to a memory in the host.

In the foregoing related technical solution, the data needs to be read from the memory in the host to the memory on the network adapter. This imposes great pressure on a bus of the network adapter, and greatly increases overheads of the processor on the network adapter. In addition, the network adapter needs a large quantity of memories to store the data. Storage and management of the data greatly increase program complexity and memory resource consumption.

SUMMARY

This application provides a data processing method for a network adapter and a network adapter. The network adapter may not need a large quantity of memories to store to-be-written data. This reduces program complexity and memory resource consumption.

According to a first aspect, a data processing method for a network adapter is provided, including the network adapter that obtains a first I/O command. The first I/O command instructs to write data stored in a local server to at least one remote server, and the first I/O command includes address information and length information that are of the data and that are stored in the local server. The network adapter splits the data based on the address information and the length information, to obtain a plurality of groups of address information and length information. The network adapter obtains, from the local server based on the plurality of groups of address information and length information, data corresponding to the plurality of groups of address information and length information, and sends the data to the at least one remote server.

In the foregoing technical solution, for an I/O write command, to-be-written data does not need to be migrated from a memory in a host to a memory on the network adapter. The network adapter processes a storage service based on a storage address and a data length of data in the memory in the host, instead of based on real to-be-written data stored in the memory in the host. In this way, data does not need to be read from the memory in the host to the memory on the network adapter. This can reduce pressure of a bus of the network adapter, and also reduces overheads of a processor on the network adapter. In addition, the network adapter does not need a large quantity of memories to store to-be-written data. This reduces program complexity and memory resource consumption.

In a possible implementation, the network adapter obtains, from a first virtual machine (VM) based on the plurality of groups of address information and length information and an identifier corresponding to the first VM that is in the local server and that delivers the first I/O command, the data corresponding to the plurality of groups of address information and length information.

In another possible implementation, the memory on the network adapter does not store the data.

In another possible implementation, the method further includes the network adapter that receives a plurality of I/O commands. The network adapter selects the first I/O command from the plurality of I/O commands based on a storage address at which the plurality of I/O commands are stored in the remote server and/or a VM that is in the local server and that delivers the plurality of I/O commands.

In another possible implementation, the network adapter includes a hardware engine. The hardware engine is used to process a data plane. The hardware engine on the network adapter selects the first I/O command from the plurality of I/O commands based on the storage address at which the plurality of I/O commands are stored in the remote server and/or the VM that is in the local server and that delivers the plurality of I/O commands.

In another possible implementation, the method further includes the network adapter that determines, based on context information of the first I/O command, whether the plurality of pieces of data are all written to the at least one remote server. The context information of the first I/O command includes a storage status of the plurality of pieces of data in the at least one remote server. When the plurality of pieces of data are all written to the at least one remote server separately, the network adapter sends an I/O write complete message to the local server through an interface.

According to a second aspect, a data processing method for a network adapter is provided, including the network adapter obtains a second I/O command. The second I/O command instructs to store data in at least one remote server to a local server, and the second I/O command includes address information and length information that are of the data and that are written to the local server. The network adapter splits the second I/O command based on the address information and the length information, to obtain a plurality of I/O read messages. Each of the plurality of I/O read messages includes information that is of each piece of the data and that is written to the local server. The network adapter separately sends the I/O read message to the at least one remote server.

In the foregoing technical solution, for I/O read, data read from the remote server does not need to be first written to a memory on the network adapter and then written to a VM memory. In this way, data does not need to be sent to the memory on the network adapter. This can reduce resource consumption and bandwidth pressure of the memory on the network adapter, and can also reduce overheads of a processor on the network adapter.

In a possible implementation, the information that is of each piece of the data and that is written to the local server includes any one of the following: address information and length information that are of each piece of the data and that are written to the local server, the address information and length information that are of each piece of the data and that are written to the local server and information about a VM that is in the local server and that delivers the second I/O command, or a first identifier (ID) and offset information that is of the data and that is written to the local server. The first ID is used to indicate the information about the VM that is in the local server and that delivers the second I/O command, and a plurality of groups of address information and length information that are of the data and that are written to the VM.

In another possible implementation, the method further includes the network adapter that receives a first I/O read response message from the remote server. The first I/O read response message includes first data that the local server needs to obtain from the remote server. The network adapter determines, based on the first I/O read response message, address information and length information that are of the first data and that are written to the local server. The network adapter stores the first data in the local server based on the address information and the length information.

In another possible implementation, the first I/O read response message includes the first ID and offset information that is of the first data and that is written to the local server. The network adapter determines, based on the first ID, the plurality of groups of address information and length information that are of the data and that are written to the VM. The network adapter determines, from the plurality of groups of address information and length information based on the offset information, the address information and length information that are of the first data and that are written to the local server.

In another possible implementation, the first I/O read response message includes the address information and length information that are of the first data and that are written to the local server and the information about the VM that is in the local server and that delivers the second I/O command. The network adapter determines, based on information included in the first I/O read response message, the address information and length information that are of the first data and that are written to the local server.

In another possible implementation, the length information falls within a permission table. The permission table includes a plurality of groups of address information and length information of written data in the local server. The network adapter stores the first data in the local server based on the address information and the length information included in the first I/O read response message.

In another possible implementation, the method further includes the network adapter that determines, based on context information of the second I/O command, whether the plurality of pieces of data are all written to the local server. The context information of the second I/O command includes a storage complete state of the plurality of pieces of data in the local server. When the plurality of pieces of data are all written to the local server, the network adapter sends an I/O read complete message to the local server through an interface.

According to a third aspect, a network adapter is provided, including an obtaining module, a splitting module, and a sending module.

The obtaining module is configured to obtain a first I/O command. The first I/O command instructs to write data stored in a local server to at least one remote server, and the first I/O command includes address information and length information that are of the data and that are stored in the local server.

The splitting module is configured to split the data based on the address information and the length information, to obtain a plurality of groups of address information and length information.

The sending module is further configured to obtain, from the local server based on the plurality of groups of address information and length information, data corresponding to the plurality of groups of address information and length information, and send the data to the at least one remote server.

In a possible implementation, the obtaining module is further configured to obtain, from a first VM based on the plurality of groups of address information and length information and an identifier corresponding to the first VM that is in the local server and that delivers the first I/O command, the data corresponding to the plurality of groups of address information and length information.

In another possible implementation, a memory on the network adapter does not store the data.

In another possible implementation, the network adapter further includes a scheduling module.

The obtaining module is further configured to receive a plurality of I/O commands.

The scheduling module is configured to select the first I/O command from the plurality of I/O commands based on a storage address at which the plurality of I/O commands are stored in the remote server and/or a VM that is in the local server and that delivers the plurality of I/O commands.

In another possible implementation, the network adapter includes a hardware engine. The hardware engine is used to process a data plane. The hardware engine selects the first I/O command from the plurality of I/O commands based on the storage address at which the plurality of I/O commands are stored in the remote server and/or the VM that is in the local server and that delivers the plurality of I/O commands.

In another possible implementation, the network adapter further includes a determining module.

The determining module is configured to determine, based on context information of the first I/O command, whether the plurality of pieces of data are all written to the at least one remote server. The context information of the first I/O command includes a storage status of the plurality of pieces of data in the at least one remote server.

The sending module is further configured to, when the plurality of pieces of data are all written to the at least one remote server separately, send an I/O write complete message to the local server through an interface.

Beneficial effects of any one of the third aspect or the possible implementations of the third aspect correspond to beneficial effects of any one of the first aspect or the possible implementations of the first aspect. Details are not described again.

According to a fourth aspect, a network adapter is provided, including an obtaining module, a splitting module, and a sending module.

The obtaining module is configured to obtain a second I/O command. The second I/O command instructs to store data in at least one remote server to a local server, and the second I/O command includes address information and length information that are of the data and that are written to the local server.

The splitting module is configured to split the second I/O command based on the address information and the length information, to obtain a plurality of I/O read messages. Each of the plurality of I/O read messages includes information that is of each piece of the data and that is written to the local server.

The sending module is configured to separately send the I/O read message to the at least one remote server.

In a possible implementation, the information that is of each piece of the data and that is written to the local server includes any one of the following: address information and length information that are of each piece of the data and that are written to the local server, the address information and length information that are of each piece of the data and that are written to the local server and information about a VM that is in the local server and that delivers the second I/O command, or a first identifier ID and offset information that is of the data and that is written to the local server. The first ID is used to indicate the information about the VM that is in the local server and that delivers the second I/O command, and a plurality of groups of address information and length information that are of the data and that are written to the VM.

In another possible implementation, the network adapter further includes a determining module and a storage module.

The obtaining module is further configured to receive a first I/O read response message from the remote server. The first I/O read response message includes first data that the local server needs to obtain from the remote server.

The determining module is configured to determine, based on the first I/O read response message, address information and length information that are of the first data and that are written to the local server.

The storage module is configured to store the first data in the local server based on the address information and the length information.

In another possible implementation, the first I/O read response message includes the first ID and offset information that is of the first data and that is written to the local server.

The determining module is further configured to determine, based on the first ID, the plurality of groups of address information and length information that are of the data and that are written to the VM.

The storage module is further configured to determine, from the plurality of groups of address information and length information based on the offset information, the address information and length information that are of the first data and that are written to the local server.

In another possible implementation, the first I/O read response message includes the address information and length information that are of the first data and that are written to the local server and the information about the VM that is in the local server and that delivers the second I/O command.

The determining module is further configured to determine, based on information included in the first I/O read response message, the address information and length information that are of the first data and that are written to the local server.

In another possible implementation, the determining module is further configured to determine that address information and length information included in the first I/O read response message fall within a permission table. The permission table includes a plurality of groups of address information and length information of written data in the local server.

The storage module is further configured to store the first data in the local server based on the address information and the length information included in the first I/O read response message.

In another possible implementation, the determining module is further configured to determine, based on context information of the second I/O command, whether the plurality of pieces of data are all written to the local server. The context information of the second I/O command includes a storage complete state of the plurality of pieces of data in the local server.

The sending module is further configured to, when the plurality of pieces of data are all written to the local server, send an I/O read complete message to the local server through an interface.

Beneficial effects of any one of the fourth aspect or the possible implementations of the fourth aspect correspond to beneficial effects of any one of the second aspect or the possible implementations of the second aspect. Details are not described again.

According to a fifth aspect, a network adapter is provided, including a processor and a memory. The processor runs instructions in the memory, so that a computing device performs the method steps in any one of the first aspect or the possible implementations of the first aspect.

According to a sixth aspect, a network adapter is provided, including a processor and a memory. The processor runs instructions in the memory, so that a computing device performs the method steps in any one of the second aspect or the possible implementations of the second aspect.

According to a seventh aspect, a server is provided, including the network adapter in any one of the third aspect or the possible implementations of the third aspect.

According to an eighth aspect, a server is provided, including the network adapter in any one of the fourth aspect or the possible implementations of the fourth aspect.

According to a ninth aspect, a computer-readable storage medium is provided, including instructions. The instructions are used to perform the method steps in any one of the first aspect or the possible implementations of the first aspect.

Optionally, in an implementation, the storage medium may be further a nonvolatile storage medium.

According to a tenth aspect, a computer-readable storage medium is provided, including instructions. The instructions are used to perform the method steps in any one of the second aspect or the possible implementations of the second aspect.

Optionally, in an implementation, the storage medium may be further a nonvolatile storage medium.

According to an eleventh aspect, a chip is provided. The chip obtains instructions and executes the instructions to implement the method in any one of the first aspect and the implementations of the first aspect.

Optionally, in an implementation, the chip includes a processor and a data interface. The processor reads, through the data interface, instructions stored in a memory, to perform the method in any one of the first aspect and the implementations of the first aspect.

Optionally, in an implementation, the chip may further include a memory. The memory stores instructions, a processor is configured to execute the instructions stored in the memory. When the instructions are executed, the processor is configured to perform the method in any one of the first aspect and the implementations of the first aspect.

According to a twelfth aspect, a chip is provided. The chip obtains instructions and executes the instructions to implement the method in any one of the second aspect or the possible implementations of the second aspect.

Optionally, in an implementation, the chip includes a processor and a data interface. The processor reads, through the data interface, instructions stored in a memory, to implement the method in any one of the second aspect or the possible implementations of the second aspect.

Optionally, in an implementation, the chip may further include a memory. The memory stores instructions, a processor is configured to execute the instructions stored in the memory. When the instructions are executed, the processor is configured to implement the method in any one of the second aspect or the possible implementations of the second aspect.

DESCRIPTION OF EMBODIMENTS

Figure 1:
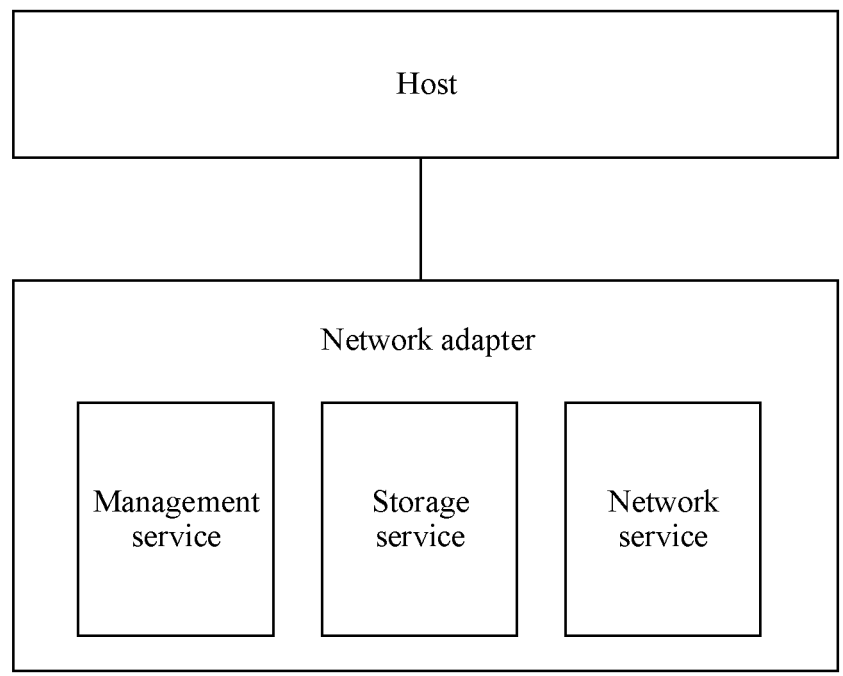
FIG. 1 is a schematic diagram of an architecture according to an embodiment of this application.

The following describes technical solutions of this application with reference to the accompanying drawings.

All aspects, embodiments, or features are presented in this application by describing a system that includes a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, the word such as "example" or "for example" is used to represent giving an example, an illustration, or a description. Any embodiment or design solution described as an "example" in this application should not be explained as being more preferred or having more advantages than another embodiment or design solution. Exactly, use of the word "example" is intended to present a concept in a specific manner.

In embodiments of this application, terms "corresponding, relevant", and "corresponding" may be interchangeably used sometimes. It should be noted that meanings expressed by the terms are consistent when differences between the terms are not emphasized.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that with evolution of a network architecture and emergence of a new service scenario, the technical solutions provided in embodiments of this application are also applicable to similar technical problems.

Reference to "an embodiment", "some embodiments", or the like described in this specification indicates that one or more embodiments of this application include a specific feature, structure, or characteristic described with reference to embodiments. Therefore, in this specification, statements such as "in an embodiment", "in some embodiments", "in some other embodiments", and "in other embodiments", that appear at different places do not necessarily mean referring to a same embodiment, instead, the statements mean referring to "one or more but not all of embodiments", unless otherwise emphasized in other ways. The terms "include", "contain", "have", and their variants all mean "include but are not limited to", unless otherwise emphasized.

In this application, "at least one" means one or more, and "a plurality of" means two or more. "And/or" describes an association relationship between associated objects and represents that three relationships may exist. For example, A and/or B may represent the following cases: only A exists, both A and B exist, and only B exists, where A and B may be singular or plural. The character "/" generally represents an "or" relationship between the associated objects. "At least one of the following items (pieces)" or a similar expression thereof means any combination of these items, including any combination of one item (piece) or a plurality of items (pieces). For example, at least one of a, b, or c may indicate: a, b, c, a and b, a and c, b and c, or a, b, and c, where a, b, and c may be singular or plural.

With the emergence of cloud computing, to reduce usage of a host processor (for example, a CPU), provide more host CPUs for external sales, or provide better user experience, and prevent a CPU of a user from being affected by more background services of a host, as shown in FIG. 1, an existing cloud computing vendor gradually offloads a management service, a storage service, a network service, and the like that originally run on the host to a network adapter, and a CPU on the network adapter processes the foregoing services. In this way, the host CPU can almost be fully provided for the user for other uses.

Figure 2:
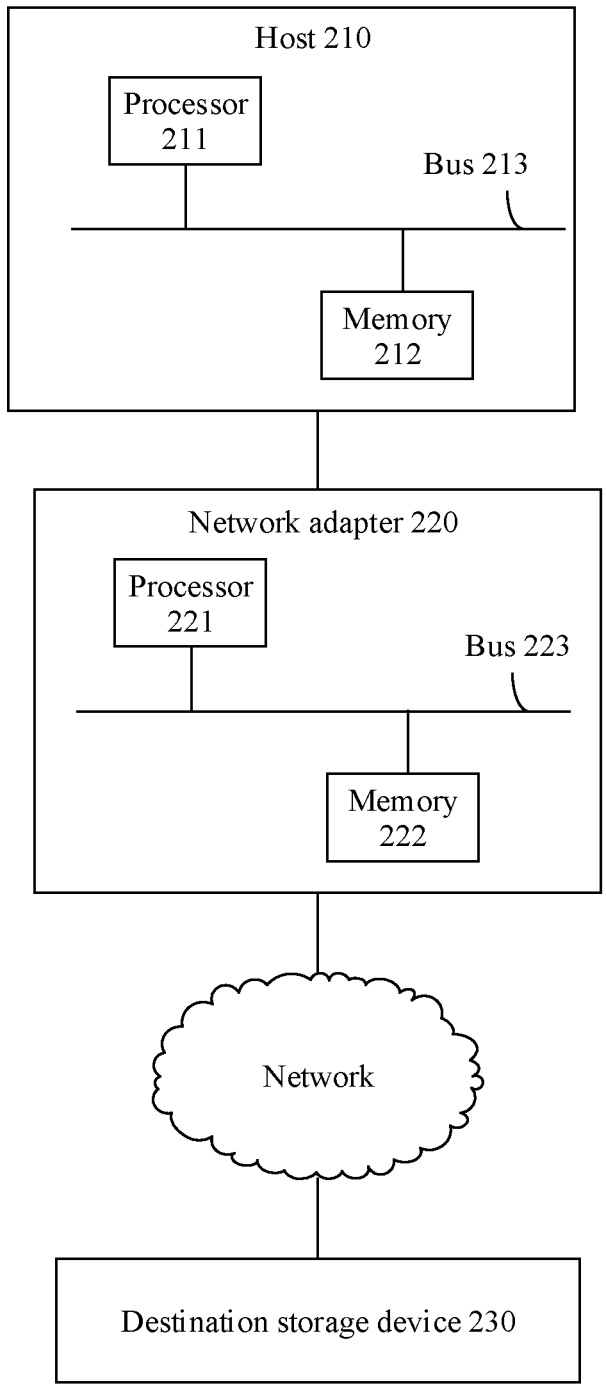
FIG. 2 is a schematic diagram of an application scenario according to an embodiment of this application.

The following describes the storage service in detail by using an application scenario shown in FIG. 2 as an example.

As shown in FIG. 2, the scenario may include a host 210, a network adapter 220, and a destination storage device 230. The following separately describes each device in detail.

1. Host 210

The host 210 may include at least one processor 211 and a memory 212.

Optionally, the host 210 further includes a system bus 213. The at least one processor 211 and the memory 212 are separately connected to the system bus 213.

The processor 211 can access the memory 212 through the system bus 213. For example, the processor 211 can perform data reading/writing or code execution in the memory 212 through the system bus. The system bus 213 may be, for example, a QuickPath Interconnect (QPI) or an Ultra Path Interconnect (UPI). The system bus 213 is classified into an address bus, a data bus, a control bus, and the like. For ease of representation, only one thick line is used to represent the bus in FIG. 2, but this does not mean that there is only one bus or only one type of bus.

In a possible implementation, a function of the processor 211 is mainly to interpret an instruction (or code) of a computer program and process data in computer software. The instruction of the computer program and the data in the computer software can be stored in the memory 212.

The processor 211 is a computing unit and a control unit of the host 210. The processor 211 may include a plurality of processor cores. All computing, command receiving, command storage, and data processing in the processor 211 are performed by the processor cores. Each of the processor cores runs program instructions independently and uses a parallel computing capability to speed up program running. The processor core has a fixed logical structure, for example, includes logical units such as a level 1 cache, a level 2 cache, an execution unit, an instruction level unit, and a bus interface.

Optionally, the processor 211 may be an integrated circuit chip, and has a signal processing capability. As an example instead of a limitation, the processor 211 is a general-purpose processor, a digital signal processor (DSP), an application-specific integrated circuit (ASIC), a field-programmable gate array (FPGA) or another programmable logic device, a discrete gate or transistor logic device, or a discrete hardware component. The general-purpose processor is a microprocessor, or the like. For example, the processor 110 is a CPU.

The memory 212 is a main memory of the host 210 (or a memory of the host 210). The memory 212 is usually configured to store various software programs that are running in an operating system, an I/O command delivered by an upper-layer application, information exchanged with an external memory, and the like. To improve an access speed of the processor 211, the memory 212 needs to have a high access speed. In some computer system architectures, a dynamic random-access memory (RAM) (DRAM) is used as the memory 212. The processor 211 can access the memory 212 at a high speed by using a memory controller (not shown in FIG. 1), to perform a read operation and a write operation on any storage unit in the memory 212.

It should be further understood that the memory 212 in this embodiment of this application may be a volatile memory or a nonvolatile memory, or may include a volatile memory and a nonvolatile memory. The nonvolatile memory may be a read-only memory (ROM), a programmable ROM (PROM), an erasable PROM (EPROM), an electrically EPROM (EEPROM), or a flash memory. The volatile memory may be a RAM, and is used as an external cache. By using examples but not limitative descriptions, many forms of RAMs may be used, for example, a static RAM (SRAM), a DRAM, a synchronous DRAM (SDRAM), a double data rate (DDR) SDRAM, an enhanced SDRAM (ESDRAM), a synchlink DRAM (SLDRAM), and a direct rambus (DR) RAM.

2. Network Adapter 220:

The network adapter 220 is configured to implement communication between the host 210 and another server (for example, the destination storage device 230 shown in FIG. 1) in a communication network. The network adapter 220 may be built in the host 210, or may be used as an external device of the host 210, and is connected to the host 210 through an interface. The interface may be, for example, a Peripheral Component Interface Express (PCIE) interface.

For ease of description, in FIG. 2, the network adapter 220 is used as an external device of the host 210 for description.

The network adapter 220 may also include a memory 222 and a processor 221.

Optionally, the network adapter 220 may further include a bus 223. An internal structure of the network adapter 220 may be similar to that of the host 210. For details, refer to the foregoing descriptions of the parts in the host 210. Details are not described herein again.

3. Destination Storage Device 230:

The destination storage device 230 may also include a memory, a processor, and a network adapter. Optionally, the destination storage device 230 may further include a bus. An internal structure of the destination storage device 230 may be similar to that of the host 210. For details, refer to the foregoing descriptions of the parts in the host 210. Details are not described herein again.

In a data processing and communication scenario, the host 210 is used as a local end, and the destination storage device 230 is used as a communication remote end. A VM on the host 210 delivers an I/O command, and the processor 211 on the host 210 may send the I/O command to the memory 212 through the bus 213. The network adapter 220 obtains the I/O command from the memory 212, and processes the I/O command.

For example, the I/O command is a read command and a write command. The read command is delivered by an application program (for example, the VM) running on the host and is used to instruct to read data from a remote device (for example, a destination storage device). The write command is delivered by an application program (for example, the VM) running on the host and is used to instruct to write data to the remote device. The processor in the host may receive the I/O command, and store the I/O command in the memory, so that the I/O command waits to be processed by the network adapter 220 and then is sent to the destination storage device 230 serving as the communication remote end.

In a related technical solution, for example, the I/O command is an I/O write command. I/O write data is stored in the memory 212, and the network adapter 220 needs to first migrate the to-be-written data from the memory 212 in the host 210 to the memory 222 on the network adapter 220. Then, the processor 221 on the network adapter 220 obtains the to-be-written data from the memory 222 on the network adapter 220, completes storage service processing for the data, generates a data message packet, and sends the to-be-written data to the destination storage device 230 at the communication remote end by using the generated message packet.

In a related technical solution, for example, the I/O command is an I/O read command. The processor 221 on the network adapter 220 obtains data from the destination storage device 230 at the communication remote end, and stores the data in the memory 222 on the network adapter 220. Then, the processor 221 obtains the data from the memory 222 on the network adapter 220, assembles the data into complete I/O data, and writes the I/O data to the memory 212 in the host 210.

In the foregoing related technical solution, the I/O write command is used as an example. The to-be-written data needs to be migrated from the memory 212 in the host 210 to the memory 222 on the network adapter 220, and then the processor 221 on the network adapter 220 completes storage service processing for the data. The data needs to be read from the memory 212 in the host 210 to the memory 222 on the network adapter 220. This imposes great pressure on the bus 223 of the network adapter 220, and greatly increases overheads of the processor 221 on the network adapter 220. In addition, the network adapter 220 needs a large quantity of memories 222 to store the data. Storage and management of the data greatly increase program complexity and resource consumption of the memory 222.

In view of this, this application provides a data storage method. The to-be-written data does not need to be migrated from the memory 212 in the host 210 to the memory 222 on the network adapter 220. This can reduce resource consumption and bandwidth pressure of the memory 222, and can also reduce overheads of the processor 221 on the network adapter 220.

Figure 3:
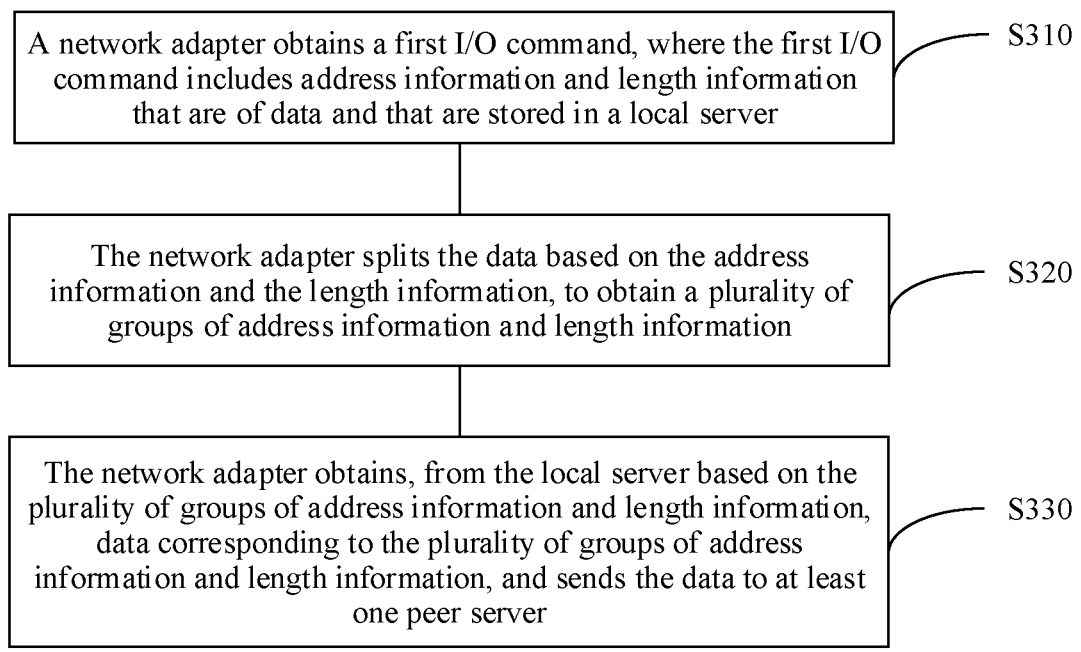
FIG. 3 is a schematic flowchart of a data processing method for a network adapter according to an embodiment of this application.

The following describes in detail a data storage method according to an embodiment of this application with reference to FIG. 3.

FIG. 3 is a schematic flowchart of a data processing method for a network adapter according to an embodiment of this application. As shown in FIG. 3, the method may include steps 310 to 330. The following separately describes steps 310 to 330 in detail.

Step 310: The network adapter obtains a first I/O command, where the first I/O command includes address information and length information that are of data and that are stored in a local server.

In this embodiment of this application, the first I/O command may be used to instruct to write the data stored in the local server to at least one remote server. As an example, the data may be stored in a memory in the local server.

In an example, the local server may be the host 210 in FIG. 2. The remote server may be a storage device, or a computing device having a computing capability. In an example, the remote server is the destination storage device 230 in FIG. 2.

The network adapter can be used as an external device of the local server, and is connected to the local server through an interface. The interface may be a PCIE interface. For a specific connection relationship, refer to the description in FIG. 2. Details are not described herein again.

Step 320: The network adapter splits the data based on the address information and the length information, to obtain a plurality of groups of address information and length information.

The network adapter may split the data based on the address information and the length information that are of the data and that are carried in the first I/O command, to obtain the plurality of groups of address information and length information. It should be understood that the address information and the length information of the data may be used to describe a data block stored in the memory in the local server.

In this embodiment of this application, a memory on the network adapter may not need to store data that is in the local server and that needs to be written to the at least one remote server. Therefore, the network adapter may split the data based on virtual address information (for example, address information and length information of the data in the memory in the local server) of the data instead of real data. In this way, the data does not need to be read from the memory in the local server to the memory on the network adapter. This can reduce pressure of a bus of the network adapter, and also reduces overheads of a processor on the network adapter. In addition, the network adapter does not need a large quantity of memories to store to-be-written data. This reduces program complexity and memory resource consumption.

Step 330: The network adapter obtains, from the local server based on the plurality of groups of address information and length information, data corresponding to the plurality of groups of address information and length information, and sends the data to the at least one remote server.

It should be understood that, in step 330, when the network adapter needs to send data to the at least one remote server, the network adapter directly obtains, from the local server based on the plurality of groups of address information and length information, the data corresponding to the plurality of groups of address information and length information, and sends the data to the at least one remote server.

It should be noted that the data obtained by the network adapter is not stored in the memory on the network adapter, but is directly sent to the at least one remote server after the data is obtained from the memory in the local server.

In a possible implementation, the network adapter may obtain, from the local server based on the plurality of groups of address information and length information that are obtained after splitting, the data corresponding to the plurality of groups of address information and length information. Optionally, in some embodiments, the network adapter may further obtain, from a first VM based on the plurality of groups of address information and an identifier corresponding to the first VM that is in the local server and that delivers the first I/O command, the data corresponding to the plurality of groups of address information and length information. In this way, the network adapter can accurately obtain data from a memory in a specific VM.

In the foregoing technical solution, the network adapter can be used as an external device of the local server, and is connected to the local server through an interface. For an I/O write command, to-be-written data does not need to be migrated from the memory in the local server to the memory on the network adapter. The network adapter processes a storage service based on a storage address and a data length of data in the memory in the local server, instead of based on real to-be-written data stored in the memory in the local server. In this way, data does not need to be read from the memory in the local server to the memory on the network adapter. This can reduce pressure of the network adapter, the memory, and the bus, and also reduces overheads of the processor on the network adapter. In addition, the network adapter does not need a large quantity of memories to store to-be-written data. This reduces program complexity and memory resource consumption.

Figure 4:
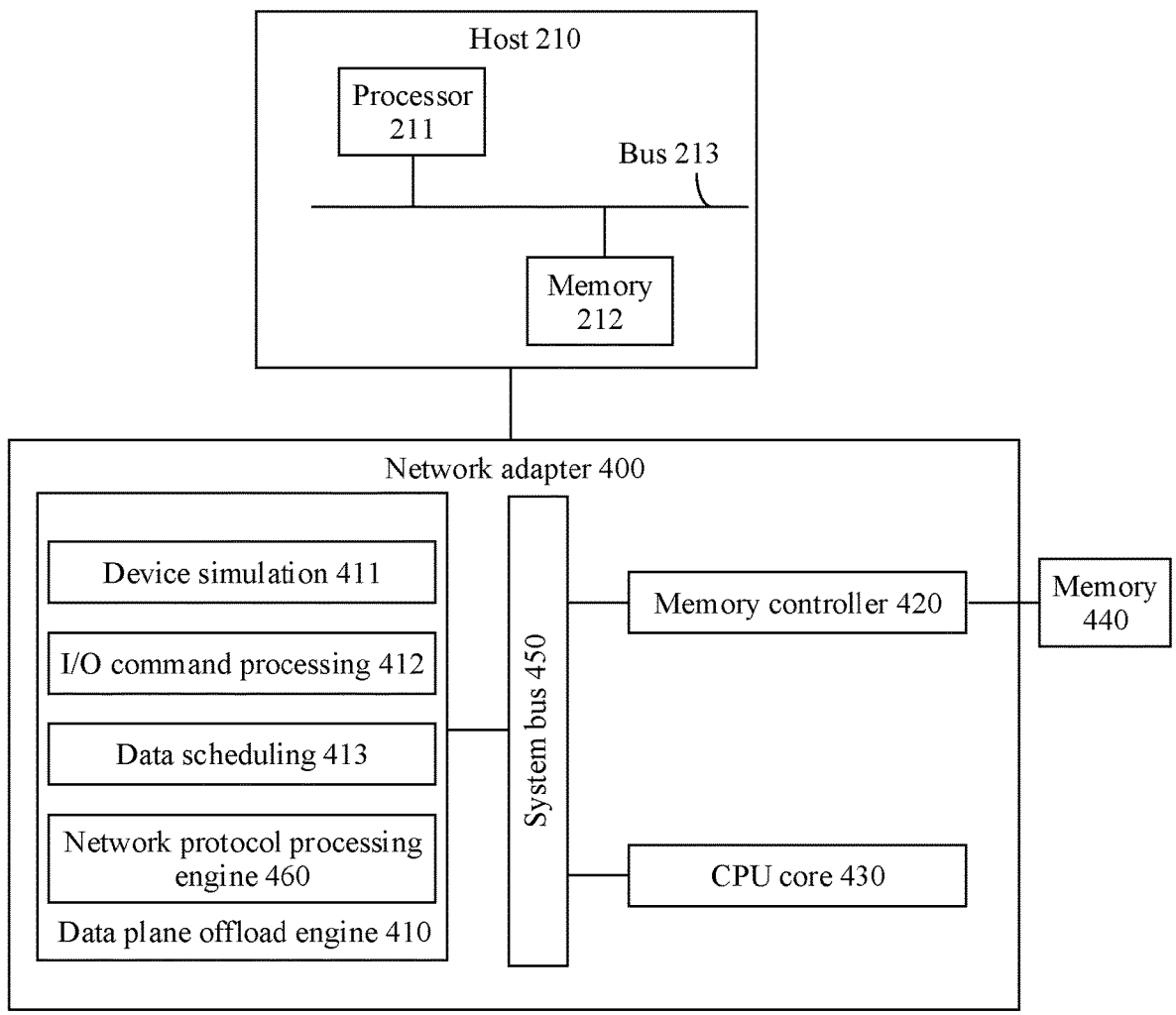
FIG. 4 is a schematic diagram of a structure of a network adapter according to an embodiment of this application.

The following describes in detail a possible structure of a network adapter according to an embodiment of this application with reference to FIG. 4.

FIG. 4 is a schematic diagram of a structure of a network adapter 400 according to an embodiment of this application. As shown in FIG. 4, the network adapter 400 is connected to the host 210 through a PCIE interface.

The network adapter 400 may include a data plane offload engine 410, a memory controller 420, a CPU core 430, a memory 440, and a system bus 450.

1. Data Plane Offload Engine 410

As an example, the data plane offload engine 410 may be formed by an engine of a dedicated processing architecture that further supports data plane processing, such as hardware logic, an FPGA, or a network processor (NP). The data plane offload engine 410 can quickly forward packets, but is not suitable for complex protocol processing.

It should be understood that the data plane offload engine 410 is suitable for network forwarding processing. Therefore, generally, a data plane for network forwarding may be undertaken by the data plane offload engine 410. However, a data plane of a storage service cannot be directly completed by the data plane offload engine 410 due to service complexity, and generally needs the CPU core 430 to complete.

The data plane offload engine 410 may be connected to the host 210 through the PCIE interface, and is configured to obtain data stored in the memory 212 in the host 210. The data plane offload engine 410 may be further connected to the CPU core 430 and the memory controller 420 through the system bus 450, to implement high-speed communication between modules inside the data plane offload engine 410, the CPU core 430, and the memory controller 420.

The data plane offload engine 410 may internally include a device simulation module 411, an I/O command processing module 412, a data scheduling module 413, and a network protocol processing engine 460.

The following separately describes in detail functions of the modules included in the data plane offload engine 410.

The device simulation module 411 is mainly configured to implement device simulation, for example, simulation of a storage device or a network device, so that the network adapter 400 presents a required device to the host or a VM running on the host. As an example, the device simulation module 411 is configured to implement presentation of a nonvolatile memory express (NVMe) storage device, a Small Computer System Interface (SCSI) device, a virtual SCSI (or virtual I/O device (virtio)-SCSI) device, a virtio-BLK device, and another type of virtio device.

It should be understood that device simulation may also be jointly completed by hardware logic and a CPU core. Generally, strong data interaction is completed by a data plane offload engine, and configuration-related simulation is completed by the CPU core and the data plane offload engine in cooperation.

The I/O command processing module 412 is configured to perform simple analysis and processing on an I/O command. In an example, the I/O command processing module 412 may be used to determine whether an I/O command is a read command or a write command. In another example, an I/O read/write command usually needs to be scheduled, to ensure I/O quality of service (QoS) of a device.

The data scheduling module 430 is configured to schedule a plurality of I/O commands. In an example, the scheduling may include QoS processing on data. For example, to avoid improper load of a VM or a volume, bandwidth and packet rate of each device need to be limited. For I/O data storage, the I/O commands need to be scheduled based on an I/O operation per second (IOPS) and bandwidth of the volume, and an IOPS and bandwidth management of the entire VM.

The network protocol processing engine 460 is mainly configured to complete network protocol processing, to ensure that data is reliably transmitted to a destination node. There may be a plurality of network protocols. This is not limited in this application. For example, the network protocol may be a Remote Direct Memory Access (RDMA) protocol. For another example, the network protocol may alternatively be a Transmission Control Protocol (TCP). For another example, the network protocol may alternatively be a user-defined reliable transmission protocol.

2. Memory Controller 420:

The memory controller 420 is configured to control data exchange between the memory 440 and the CPU core 430. Further, the memory controller 420 receives a memory access request from the CPU core 430, and controls access to the memory 440 based on the memory access request.

In an implementation example, each memory controller 420 performs addressing for the memory 440 through the system bus 450. In addition, an arbiter (not shown in the figure) is configured in the system bus. The arbiter is responsible for processing and coordinating contention access of a plurality of CPU cores 430.

3. CPU Core 430:

The CPU core 430 is a most important component of a CPU, and may also be referred to as a CPU processing unit. The CPU core 430 is made of monocrystalline silicon by using a specific production process. All computing, command receiving, command storage, and data processing of the CPU are executed by the CPU core 430. Each CPU core 430 runs program instructions independently and uses a parallel computing capability to speed up program running. Each CPU core 430 has a fixed logical structure. For example, the CPU core 430 includes logical units such as a level 1 cache, a level 2 cache, an execution unit, an instruction level unit, and a bus interface.

The CPU core 430 is generally configured to perform complex service processing, and usually runs an operating system (OS). In this way, complex service processing software, various management software, control plane software, and the like may run on the CPU core 430.

4. Memory 440:

The memory 440 may be used as an external memory of the CPU core 430, and is configured to store the program running of the CPU core 430 and some entries of the data plane offload engine 410.

The external memory 440 is not limited in this embodiment of this application. For example, the external memory 440 is a DDR memory.

It should be understood that, because an on-chip memory integrated inside the data plane offload engine 410 is a cache, the on-chip memory has a high speed and high costs, and therefore can be integrated only in a small quantity. A large quantity of entries needs to be stored in the external memory 440. For example, the external memory 440 stores a large forwarding flow table required for network forwarding, receiving and sending queues of a network connection, a context entry of a network connection, a context entry of an I/O, and the like.

It should be further understood that, data is sent to the CPU actually means that data is sent to the external memory 440 of the CPU core 430. The data is sent to the CPU and the data is sent to the CPU memory mentioned below in this specification mean that the data is sent to the external memory 440 of the CPU core 430.

5. System Bus 450:

The system bus 450 may be connected to the data plane offload engine 410, the CPU core 430, and the memory controller 420, so that the data plane offload engine 410, the CPU core 430, and the memory controller 420 may communicate with each other through the system bus 450.

Figure 5:
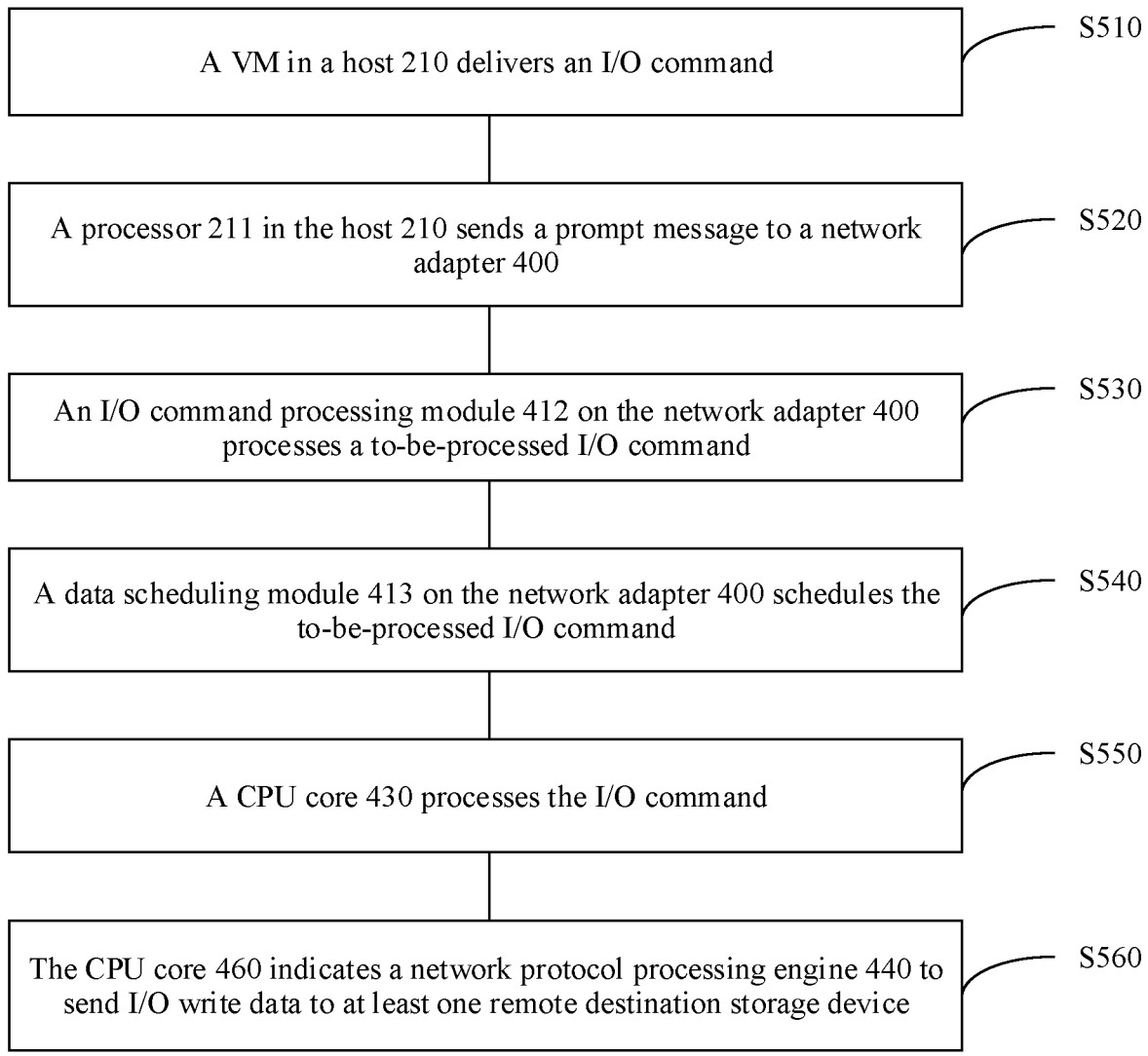
FIG. 5 is a schematic flowchart of a method for processing an I/O write command by a network adapter according to an embodiment of this application.

The following uses the hardware architecture shown in FIG. 4 as an example to describe in detail, with reference to an example in FIG. 5, a specific implementation in which a network adapter processes an I/O write command. It should be understood that the example in FIG. 5 is merely intended to help a person skilled in the art understand embodiments of this application, but is not intended to limit embodiments of this application to a specific value or a specific scenario in FIG. 5. It is clearly that a person skilled in the art can make various equivalent modifications or changes based on the provided example, and such modifications and changes also fall within the scope of embodiments of this application.

FIG. 5 is a schematic flowchart of a method for processing an I/O write command by a network adapter according to an embodiment of this application. As shown in FIG. 5, the method may include steps 510 to 560. The following separately describes steps 510 to 560 in detail.

Step 510: A VM in the host 210 delivers an I/O write command.

A VM in the host may initiate an I/O write command of a storage service based on a storage I/O device interface (for example, NVMe, SCSI, Virtio-BLK, or Virtio-SCSI).

It should be noted that an I/O command or a to-be-processed I/O command mentioned in the embodiment shown in FIG. 5 may be understood as a to-be-processed I/O write command.

It should be understood that in this embodiment of this application, a virtual device may be identified by using an ID. The foregoing storage I/O device is generally mapped to a function on a PCIE. When single-root I/O virtualization (SR-IOV) is enabled, the foregoing storage I/O device may be a physical function (PF) or a virtual function (VF). When scalable I/O virtualization (scalable-IOV) is enabled, the foregoing storage I/O device may further be an ADI.

Generally, there are more VFs. In a VM application scenario, the VF is mainly allocated to the VM. For ease of description, the VF is used in the following description. However, unless only the PF can be used is specified, All VF descriptions are also applicable to the PF. In other words, in an example, a VM running on the host 210 may be identified by using the VF.

Step 520: The processor 211 in the host 210 sends a prompt message to the network adapter 400.

After sending the to-be-processed I/O write command to the memory 212, the processor 211 may send the prompt message to the network adapter 400. The prompt message is used to notify the data plane offload engine 410 that there is a to-be-processed I/O command.

In an example, the prompt message may be a door bell (DB).

Step 530: The I/O command processing module 412 on the network adapter 400 processes the to-be-processed I/O write command.

For an I/O command such as an I/O read command or an I/O write command, QoS control usually needs to be performed. For example, for logical unit number (LUN) information (namespace in NVMe) in the I/O command, a LUN ID of a VM and VF information of an ingress may be converted into a global LUN ID. The global LUN ID may be address information of a destination storage device. Alternatively, a LUN ID of VF+VM can be directly used.

For ease of description, the LUN ID in the following may be understood as the global LUN ID.

It should be understood that VF information (for example, a VF ID) is not in the I/O command, just like a port attribute of a packet entering the network adapter, the information is not in the packet.

Step 540: The data scheduling module 430 on the network adapter 400 schedules the to-be-processed I/O command.

It should be understood that step 540 is optional. That is, if the to-be-processed I/O command includes a plurality of I/O commands, to avoid improper load of a VM or a volume, bandwidth and packet rate of each device need to be limited. Therefore, the plurality of I/O commands need to be scheduled, and an I/O command that meets a condition is selected from the plurality of I/O commands. The data scheduling module 430 may store the I/O command that meets the condition in an I/O message receiving queue in the memory 440 on the network adapter 400.

Figure 6:
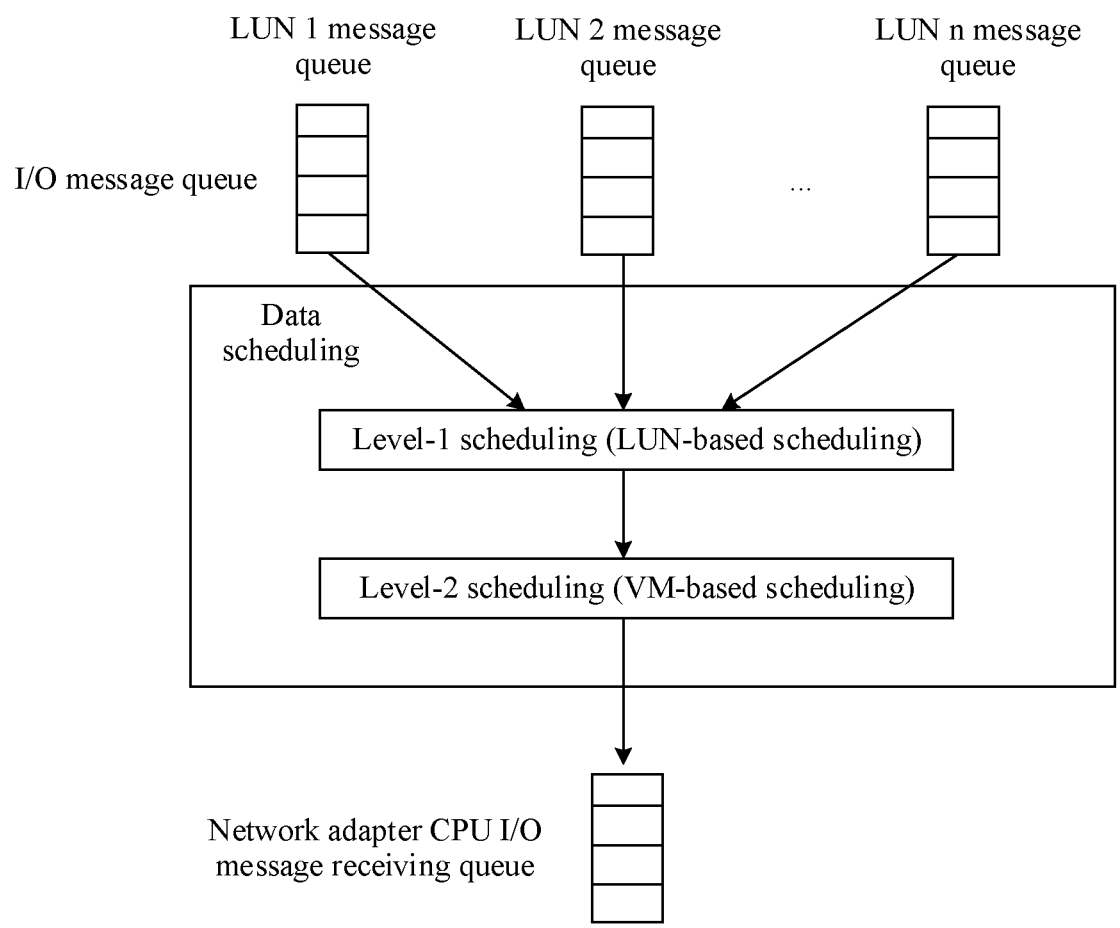
FIG. 6 is a schematic block diagram of I/O command scheduling according to an embodiment of this application.

As shown in FIG. 6, the data scheduling module 430 in the data plane offload engine 410 schedules the plurality of I/O commands, and stores the scheduled I/O commands in the I/O message receiving queue.

In a possible implementation, the data scheduling module 430 may perform level-1 scheduling on the plurality of I/O commands, and select the I/O command that meets the condition. For example, the data scheduling module 430 may schedule the to-be-processed I/O command based on a storage address for storing the to-be-processed I/O command in the destination storage device, and select the I/O command that meets the condition. For another example, the data scheduling module 430 may further schedule the to-be-processed I/O command based on a VM that is in the host 210 and that delivers the plurality of I/O commands, and select the I/O command that meets the condition.

In another possible implementation, the data scheduling module 430 may further perform multi-level scheduling on the plurality of I/O commands, and select the I/O command that meets the condition. Level-2 scheduling is used as an example. At the first level, the I/O commands are scheduled based on a LUN ID. At the second level, the I/O commands are scheduled based on a VM. Further, the data scheduling module 430 may schedule the to-be-processed I/O command based on the storage address for storing the to-be-processed I/O command in the destination storage device and the VM that is in the host 210 and that delivers the plurality of I/O commands, and select the I/O command that meets the condition.

In this embodiment of this application, if a specification of the I/O message receiving queue is not large, an internal cache of the data plane offload engine 410 may be used for storage. However, if the specification of the I/O message receiving queue is relatively large, and a cache inside the chip cannot store the I/O message receiving queue, these queues may be placed in the external memory 440 of the network adapter 400.

The I/O command that meets the condition may be performing traffic measurement on a size of data read/written by using the I/O command. It should be understood that the foregoing measurement may include but is not limited to measuring an IOPS, an allowed quantity of I/O times per second, I/O bandwidth, or the like.

In this embodiment of this application, a token bucket algorithm may be used to perform traffic measurement. According to the token bucket algorithm, a specific quantity of tokens is placed in a token bucket, and one token allows data of a specified unit (for example, 1 Byte) to be sent. After data of 1 Byte is sent, a token needs to be removed from the bucket. When there are no remaining tokens in the bucket, sending data of any size is considered to exceed rated bandwidth. Data can be sent only when there are remaining tokens in the bucket.

For example, two token buckets can be used to obtain more committed performance (guaranteed performance) and allowed peak performance (maximum allowed performance when a processing capability is idle), to implement more accurate control.

The token bucket algorithm is like water in a pond, which can flow out or in. Tokens in the token bucket can be removed, and also tokens can be added to the token bucket. To ensure that data can be sent at any time, tokens can be added to the bucket. Therefore, a rate at which tokens are added to the token bucket determines a rate at which data is sent. For example, if bandwidth of a user is set to 1 gigabit per second (Gbps) and each token indicates 1 megabit (Mb), what only needs to be ensured is that 1000 tokens are added to the bucket per second.

Therefore, in this embodiment of this application, to obtain a more flexible QoS scheduling effect, the token bucket provides a token adjustment interface, and the CPU core 430 performs token refund based on a packet feature. For example, to prevent the VM from continuously generating small I/O commands, the CPU core 430 may perform field merging to properly refund some tokens. This can prevent insufficient bandwidth from affecting user experience.

In the foregoing technical solution, a data plane performs QoS scheduling, so that more accurate and stable QoS assurance and better performance can be obtained. The CPU core supports token refund adjustment, which can provide higher QoS flexibility.

Step 550: The CPU core 430 processes the I/O command.

After the I/O command is stored in the external memory 440 of the network adapter 400, software on the CPU core 430 analyzes the I/O command. As an example, the I/O command may generally include information such as a LUN, a logical block address (LBA), a data size, and a scatter gather (SG) list pointing to a data block.

The LUN represents an ID of a to-be-accessed storage unit, for example, an ID of the destination storage device 230 shown in FIG. 2. The LBA indicates a block in which data on the to-be-accessed storage unit is located, that is, a start address of a logical address of the to-be-accessed data stored in the LUN. The size indicates a size of data after the address is read. The CPU core 430 may address the destination storage device based on the LUN, the LBA, and the size.

The SG list is a list consisting of a plurality of addresses and lengths. An address and a length form a memory block, and a plurality of address blocks form a total memory size required for storing I/O data in the host. In other words, the SG list describes a scattered data block by using a sequence of a start address+a length, and a plurality of data blocks are combined into a logically consecutive data block.

It should be understood that an address+a length in the SG list may correspond to the address information and the length information of the foregoing data.

For I/O write, the SG list indicates locations in a memory in the host from which data is read and written to the destination storage device.

It should be noted that the SG has only address and length information. During virtualization application, VF ID information further needs to be added, so that the SG can be accurately mapped to a memory address of a corresponding VM.

In this embodiment of this application, the CPU core 430 may process the storage service based on an address and a data length that are of to-be-processed data and that are in the host memory. There is a plurality of processing processes of the storage service, for example, data splitting processing, data deduplication, data encryption, data compression, and data snapshot.

The following uses data splitting processing as an example to describe in detail a specific implementation process in which the CPU core 430 processes the storage service based on the address and the data length that are of the to-be-processed data and that are in the host memory.

It should be understood that, for a distributed storage system commonly used in cloud computing, data is stored in hundreds or thousands of destination storage devices in a distributed manner. In this way, high-speed concurrent access to data can be implemented, extremely high performance can be obtained, and better security and scalability can be obtained. This process is a process of splitting data. That is, data is split into data blocks of a fixed size, for example, split into data blocks of sizes such as 4 K, 8 K, 16 K, and 32 K, and different data blocks are sent to different destination storage devices.

For I/O write, to-be-written data needs to be split, and different data blocks are sent to different destination storage devices. For I/O read, different data blocks need to be separately obtained from a plurality of destination storage devices, and the different data blocks are combined into a complete piece of I/O data. Read is an inverse process of write.

Optionally, in some embodiments, to improve efficiency of sending data to a plurality of destination storage devices, aggregation may be performed properly. A plurality of data blocks sent to a same destination storage device are combined into a larger data packet, for example, combined into a 128 kilobits (KB) large packet and sent at a time. In this way, it can be avoided that the CPU core 430 is overloaded because a protocol stack is frequently invoked to send data.

Figure 7:
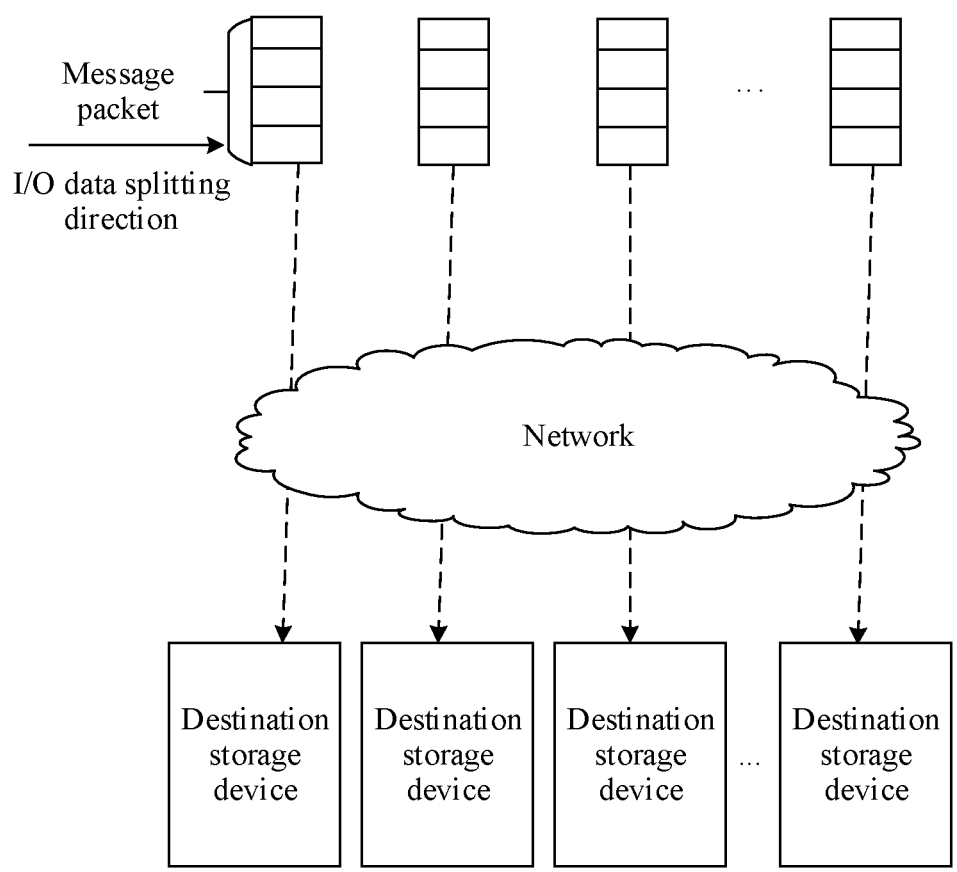
FIG. 7 is a schematic block diagram of a data splitting process according to an embodiment of this application.

Generally, a process of splitting data is shown in FIG. 7. I/O data is split horizontally, and one piece of I/O data is split into a plurality of data blocks. Data packets are generated vertically, and each data packet uniquely corresponds to one distributed remote destination storage device. Each data packet may include one data block, or may include a plurality of data blocks sent to a same destination storage device.

In this embodiment of this application, because real I/O write data is stored in the memory 212 in the host 210 instead of the memory 440 on the network adapter 400, a process in which the CPU core 430 partitions the data is not based on the real I/O write data. Instead, splitting is performed based on a virtual data pointer (address information and length information of the data in the memory 212 in the host 210) of the SG in the I/O command, and the virtual data pointer points to a data block corresponding to an address and a length of a VF in the host.

In other words, in this embodiment of this application, real I/O write data is not split. Instead, splitting is performed based on a memory address and a data length that are in the memory 212 and that store I/O data of a VM, to obtain split VF+SG information.

Step 560: The CPU core 430 indicates the network protocol processing engine 460 to send I/O write data to at least one remote destination storage device.

After completing processing the I/O command, the CPU core 430 may generate a message packet. The message packet includes a message header. The message header may carry information about a corresponding destination storage device, and the information may generally be a sending queue of a network connection. The CPU core 430 may put M split data blocks into M message queues. Each data block stores VF+SG information instead of real to-be-written data.

The CPU core 430 may further initiate a storage data processing instruction to the network protocol processing engine 460. The instruction is used to instruct the network protocol processing engine 460 to obtain real I/O write data, perform message encapsulation on the real I/O write data, and send an encapsulated packet to a corresponding remote destination storage device, to implement an I/O write process.

As an example, the network protocol processing engine 460 separately reads, from the M message queues, the VF+SG information stored in each data block, and separately initiates a DMA to a VM corresponding to the VF, to obtain, based on the VF+SG information, real I/O write data corresponding to each data block.

Figure 8:
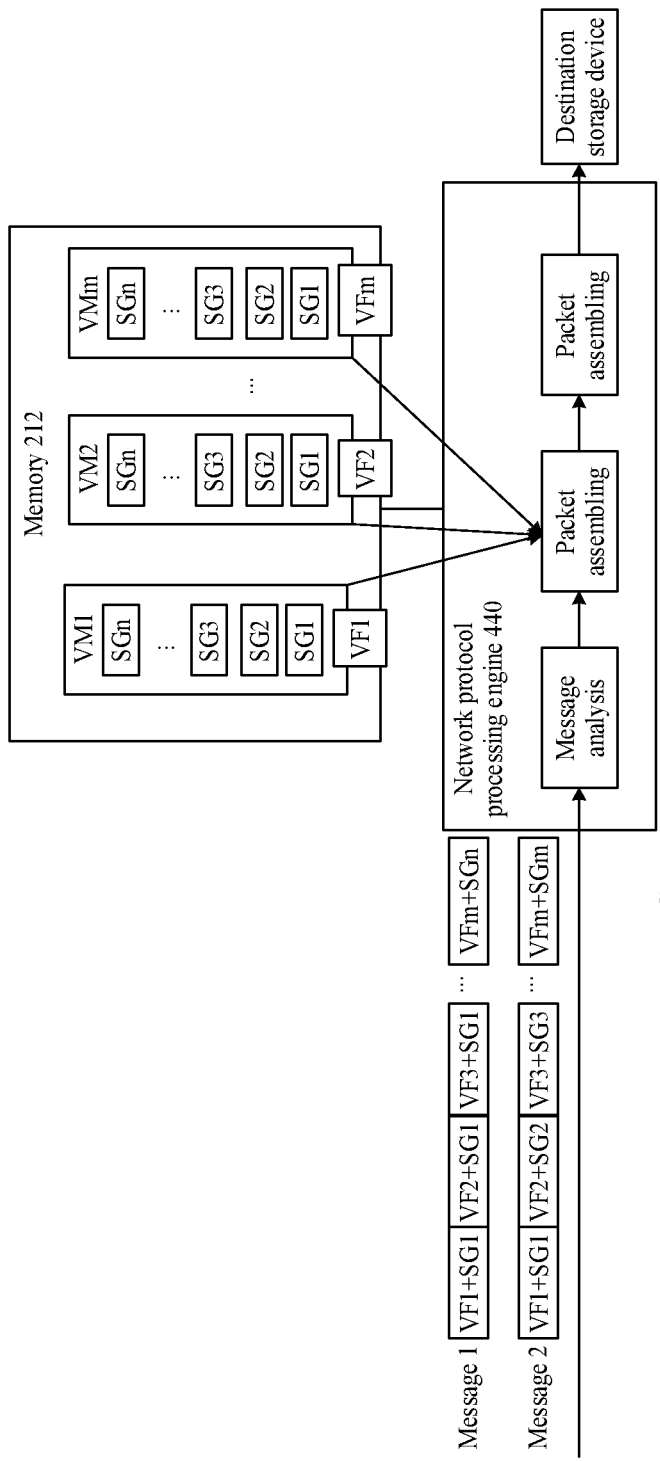
FIG. 8 is a schematic block diagram of an I/O command processing process according to an embodiment of this application.

As shown in FIG. 8, for example, a message 1 that is sent by the CPU core 430 and that can be received by the network protocol processing engine 460 includes: VF1+SG1, VF2+SG1, VF3+SG1, . . . , and VFm+SGn. The network protocol processing engine 460 may obtain or read, from the memory 212 in the host 210 through the PCIE interface, data corresponding to VF1+SG1, data corresponding to VF2+SG1, data corresponding to VF3+SG1, . . . , and data corresponding to VFm+SGn.

For another example, a message 2 that is sent by the CPU core 430 and that can be received by the network protocol processing engine 460 includes: VF1+SG1, VF2+SG2, VF3+SG3, . . . , and VFm+SGm. The network protocol processing engine 460 may obtain or read, from the memory 212 in the host 210 through the PCIE interface, data corresponding to VF1+SG2, data corresponding to VF2+SG2, data corresponding to VF3+SG2, . . . , and data corresponding to VFm+SGm.

The network protocol processing engine 460 may encapsulate the data obtained from the memory 212, combine the data into a message that actually includes the data, and send the message to the remote destination storage device, so as to write the I/O write data to the destination storage device.

Optionally, the network adapter 400 may further determine, based on context information of the I/O command, whether all the data is written to the at least one destination storage device. When all the plurality of pieces of data are separately written to the at least one destination storage device, the network adapter 400 sends an I/O write complete message to the host 210 through the PCIE interface. It should be understood that the context information of the I/O command may include a storage status of the data in the at least one destination storage device.

Figure 9:
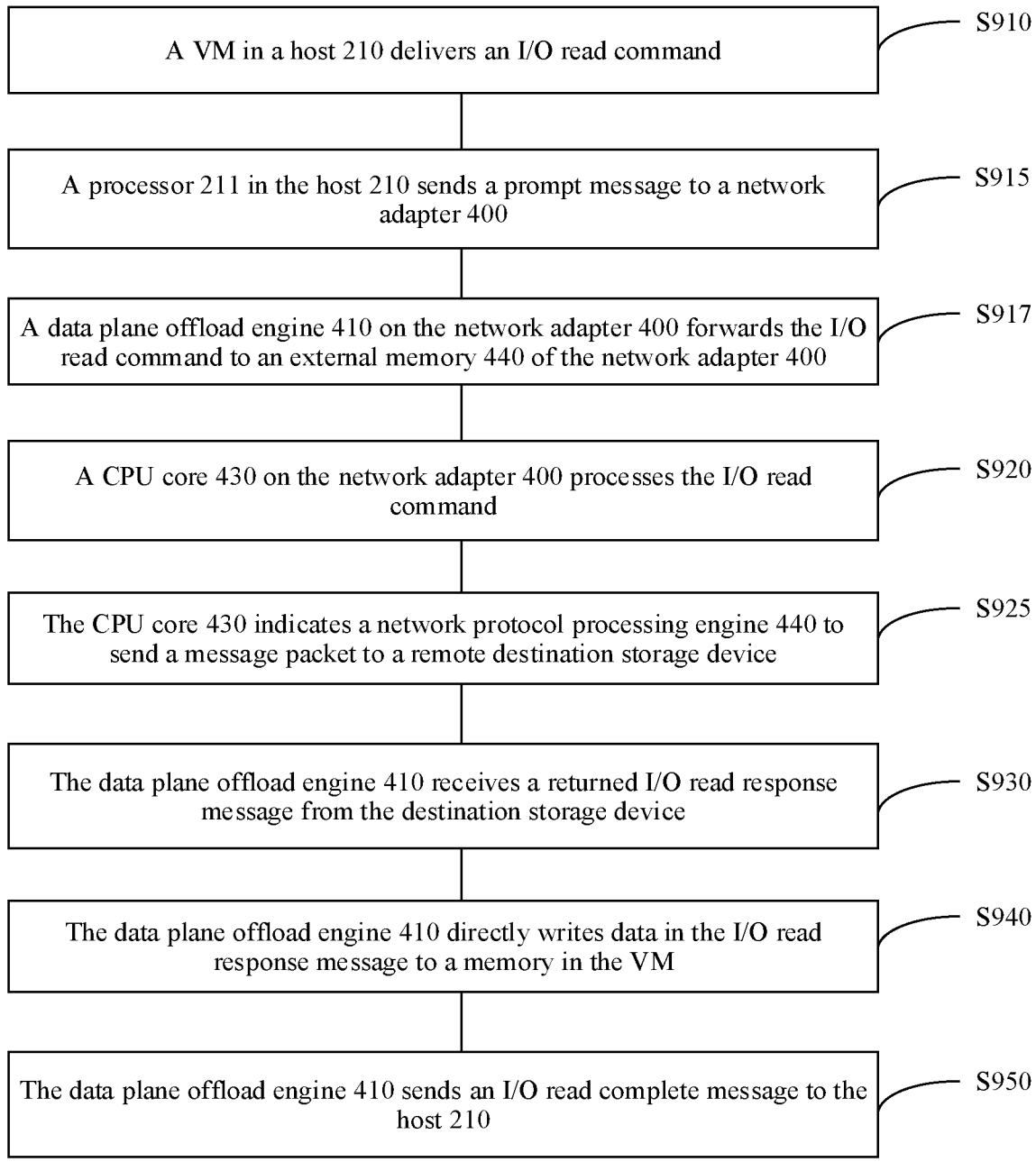
FIG. 9 is a schematic flowchart of a method for processing an I/O read command by a network adapter according to an embodiment of this application.

The following uses the hardware architecture shown in FIG. 4 as an example to describe in detail, with reference to an example in FIG. 9, a specific implementation in which a network adapter processes an I/O read command. It should be understood that the example in FIG. 9 is merely intended to help a person skilled in the art understand embodiments of this application, but is not intended to limit embodiments of this application to a specific value or a specific scenario in FIG. 9. It is clearly that a person skilled in the art can make various equivalent modifications or changes based on the provided example, and such modifications and changes also fall within the scope of embodiments of this application.

FIG. 9 is a schematic flowchart of a method for processing an I/O read command by a network adapter according to an embodiment of this application. As shown in FIG. 9, the method may include steps 910 to 950. The following separately describes steps 910 to 950 in detail.

Step 910: A VM in the host 210 delivers an I/O read command.

The I/O read command is used to instruct to obtain to-be-read data from a destination storage device and store the data in the host 210. For example, the data may be stored in a memory corresponding to a VM that is in the host 210 and that delivers the I/O read command.

The I/O read command may also be referred to as an I/O read message.

Step 915: The processor 211 in the host 210 sends a prompt message to the network adapter 400.

Step 917: The data plane offload engine 410 on the network adapter 400 forwards the I/O read command to the external memory 440 of the network adapter 400.

Step 920: The CPU core 430 on the network adapter 400 processes the I/O read command.

Software on the CPU core 430 analyzes the I/O read command. The I/O read command may generally include read information about the destination storage device. The information about the storage device includes but is not limited to information such as a LUN, an LBA, a data size, and a VF+SG list of a memory locally storing data in the host 210.

For I/O read, the VF+SG information indicates locations in a memory in the host 210 to which data read from the destination storage device is written.

In this embodiment of this application, the CPU core 430 may split the I/O read command based on address information and length information (an SG list) that are of the data read from the destination storage device and that are written to the memory in the host 210, to obtain a plurality of I/O read messages. Each of the plurality of I/O read messages includes information that is about each piece of the data read from the destination storage device and that is written to the memory in the host 210.

It should be understood that the information that is about each piece of the data and that is written to the memory in the host 210 includes any one of the following: address information and length information (an SG list) that are of each piece of the data and that are written to the memory in the host 210, or address information and length information that are of each piece of the data and that are written to the memory in the host 210 and information (a VF+SG list) about a VM that is in the host 210 and that delivers the I/O read command, or a first identifier ID and offset information that is of the data and that is written to the memory in the host 210. The first ID is used to indicate the information about the VM that is in the host 210 and that delivers the I/O read command and a plurality of groups of address information and length information (an SG list) that is of the data and that is written to the VM.

Step 925: The CPU core 430 indicates the network protocol processing engine 460 to send a message packet to a remote destination storage device.

After completing processing the I/O read command, the CPU core 430 may indicate the network protocol processing engine 460 to send the plurality of I/O read messages to a plurality of remote destination storage devices. The message may include a message header. The message header may carry storage address information of a corresponding destination storage device, and the information may generally be a sending queue of a network connection.

The CPU core 430 may further notify the network protocol processing engine 4600 to initiate network protocol sending processing, and the network protocol processing engine 4600 sends an I/O read message packet to a corresponding destination storage device.

Step 930: The data plane offload engine 410 receives a returned I/O read response message from the destination storage device.

The destination storage device may read corresponding storage data based on storage address information in the I/O read message packet, and feed back the storage data to the data plane offload engine 410 by using the I/O read response message.

The I/O read response message may be understood as a response packet fed back by the destination storage device for the received I/O read command.

There is a plurality of formats of the I/O read response message returned by the destination storage device. This is not limited in this application. The following provides detailed descriptions with reference to step 940. Details are not described herein.

Step 940: The data plane offload engine 410 directly writes data in the I/O read response message to the memory in the VM.

In this embodiment of this application, after receiving the data in the I/O read response message, the data plane offload engine 410 may not first write the data to the memory 440 on the network adapter 400, and then write, from the memory 440, the data to the memory in the VM that delivers the I/O read command, but may directly write the data in the I/O read response message to the memory in the VM that delivers the I/O read command. In other words, the memory 440 on the network adapter 400 does not store the data in the I/O read response message.

The data plane offload engine 410 needs to obtain, based on the I/O read message, address information and length information that are of each data block and that are stored in the memory 212 in the host 210, so that the data can be directly written to the memory in the VM in the host 210, and does not need to be first written to the memory 440 on the network adapter 400 and then written to the memory in the VM. In this way, the data does not need to be sent to the memory on the network adapter. This can reduce resource consumption and bandwidth pressure of the memory on the network adapter, and can also reduce overheads of a processor on the network adapter.

Further, the data plane offload engine 410 may determine VF+SG information that is of each data block and that is stored in the memory 212 in the host 210. There is a plurality of specific implementations of obtaining the VF+SG information. The following separately describes different implementations in detail.

Figure 10:
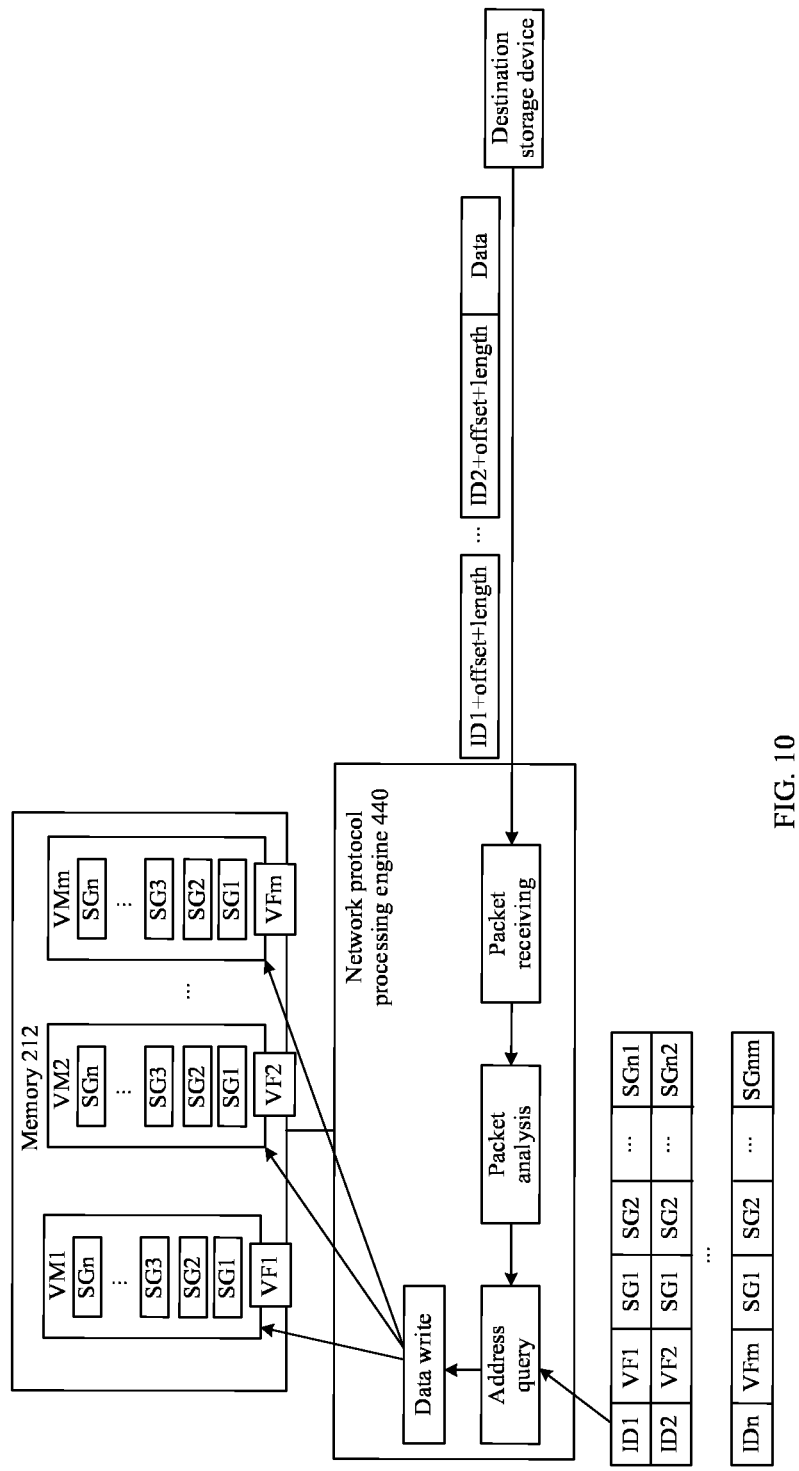
FIG. 10 is a schematic flowchart of a method for processing an I/O write response message by a network adapter according to an embodiment of this application.

Refer to FIG. 10. In a possible implementation, the I/O read response message may include an ID of an I/O of each data block, offset information, and data. The data plane offload engine 410 may query a context of a corresponding I/O based on an ID of an I/O of each data block in the I/O read response message, to obtain the VF+SG information.

It should be understood that, in this embodiment of this application, after the I/O read command is sent to the destination storage device, the CPU core 430 of the data plane offload engine 410 may apply for context information of the I/O, and a context of one I/O may correspond to one ID. The context information of the I/O may be used to record an ID of an I/O corresponding to each block, a home VF for processing the I/O, a local LUN and SG list of the VM, and an address and a length of to-be-read data in the destination storage device.

It should be noted that one I/O read command may include a plurality of such blocks, and the blocks may be different blocks of different I/Os.

For example, if an ID corresponding to a data block in the I/O read message is ID1 and offset information is 2, referring to FIG. 10, when performing address query, the data plane offload engine 410 may determine, based on the ID1 and the offset information 2, that information of the data block stored in the memory 212 in the host 210 is VF1+SG2. After obtaining the information of VF1+SG2, the data plane offload engine 410 may directly write the data to the memory 212 in the host 210 by using a direct memory access (DMA) technology.

Figure 11:
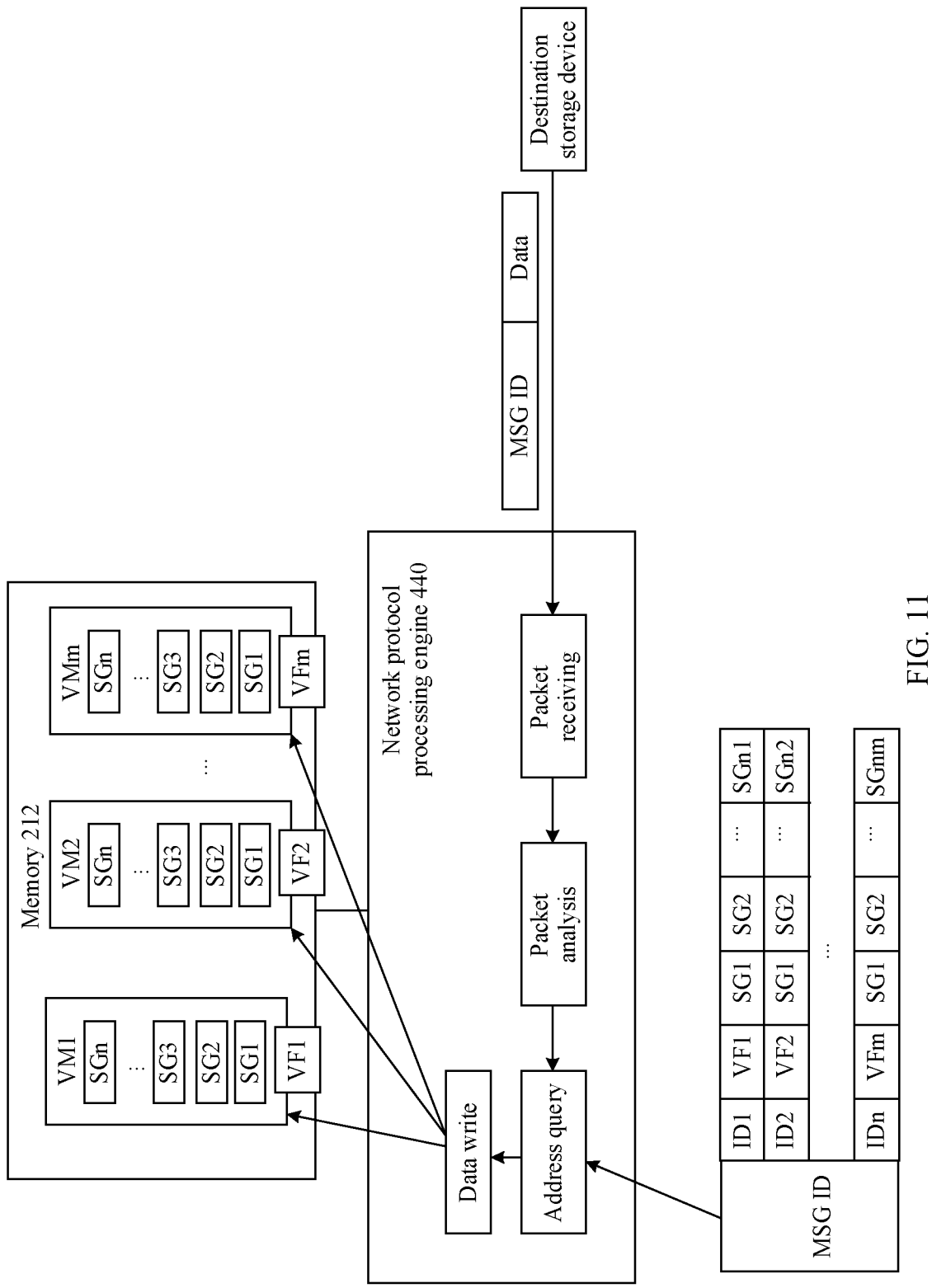
FIG. 11 is a schematic flowchart of another method for processing an I/O write response message by a network adapter according to an embodiment of this application.

Refer to FIG. 11. In another possible implementation, the I/O read response message may include a message (MSG) ID and data. The data plane offload engine 410 may obtain VF+SG information in an MSD ID table based on the MSG ID in the I/O read response message.

It should be understood that, in this embodiment of this application, one ID and one MSG ID table may be created based on each I/O read message, and the MSG ID table records VF+SG information of a data block corresponding to each data slice. A sent I/O read message may carry an MSG ID, and certainly, further needs to carry length information of each block. A sequence of blocks is the same as that of IDs in the MSG ID table.

When the I/O read response message is returned, after obtaining SG information in the MSD ID table based on an MSG ID of the returned message, the data plane offload engine 410 may obtain, based on a number of a data block, a specific address to which data needs to be placed. In addition, the data is written to the address by using the DMA technology, so that the data is directly written to the memory in the VM.

Figure 12:
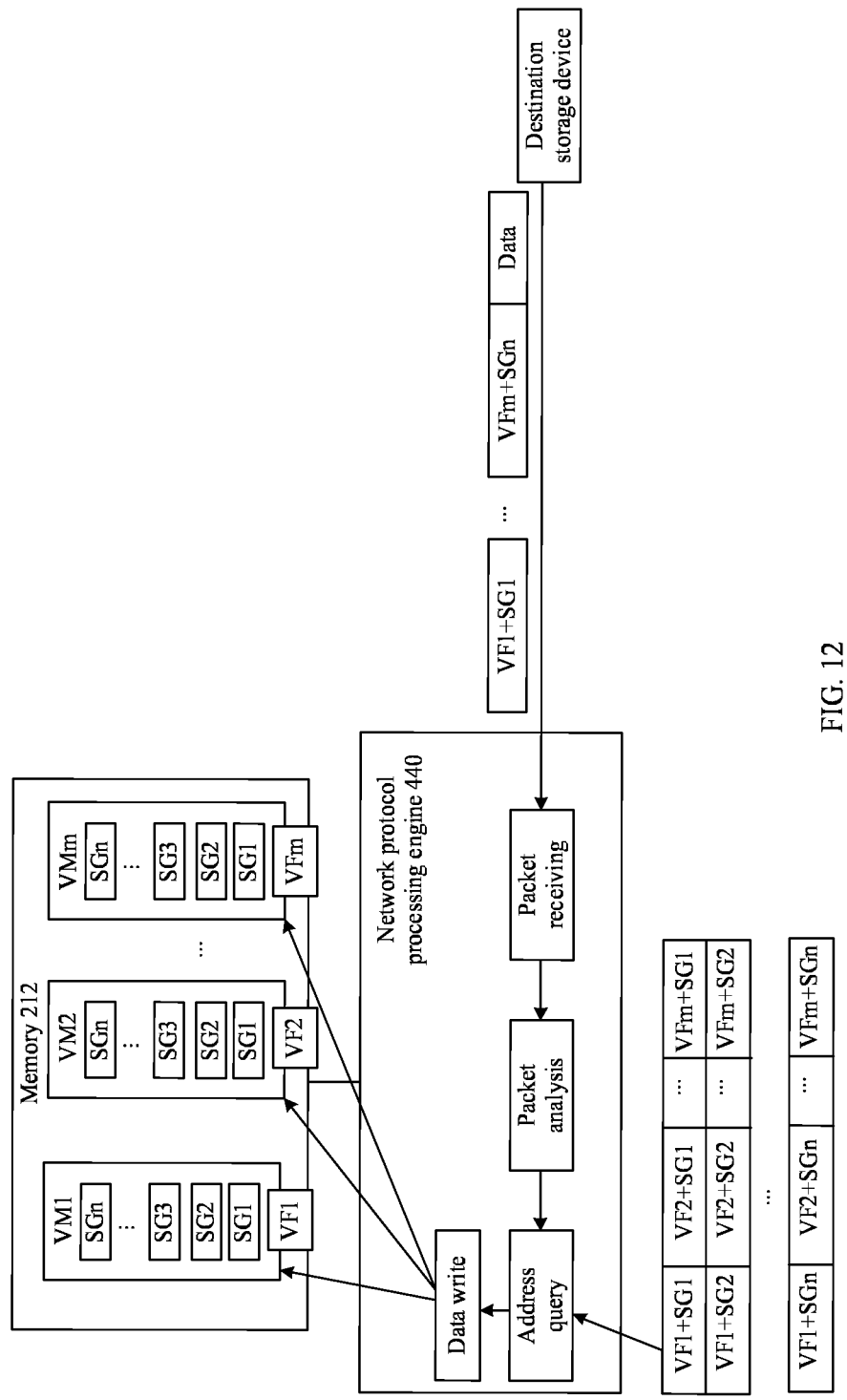
FIG. 12 is a schematic flowchart of still another method for processing an I/O write response message by a network adapter according to an embodiment of this application.

Refer to FIG. 12. In another possible implementation, the I/O read response message may carry one or more VFs+SGs and data. It should be understood that the one or more VFs+SGs carried in the I/O read response message are information about an address at which the read data is stored in the memory in the host.

The data plane offload engine 410 may directly obtain VF+SG information of a corresponding data block by using the I/O read response message, and directly write the data to the memory 212 in the host 210 based on the VF+SG information by using the DMA technology.

Optionally, in some embodiments, to check whether the VF+SG information carried in the I/O read response message is valid, the data plane offload engine 410 may compare an SG address in the I/O read response message with SG information in a corresponding SG permission table queried based on the VF to determine whether the SG address is within an address range of the permission table. If the SG address is within the address range of the permission table, the data plane offload engine 410 directly writes, by using the DMA technology, the data to a host address corresponding to the VF+SG, so that the data is directly written to the memory in the VM. Otherwise, the write of the data block is discarded and error handling is notified.

It should be further understood that, in this embodiment of this application, an SG permission table may be established for each VF for each I/O read message. When an I/O is initiated, an SG permission table is created. When the I/O is completed, a corresponding SG permission is deleted. The SG permission table includes writing data to a VF+SG corresponding to the memory in the VM.

Step 950: The data plane offload engine 410 sends an I/O read complete message to the host 210.

Because the returned I/O read response message includes returned messages of M data packets, it indicates that one I/O read is completed only after the returned messages of the M data packets arrive. Because processing in this process is relatively simple, in this embodiment of this application, the data plane offload engine 410 may complete the processing. In this way, returned data may not be processed by the CPU core 430 on the network adapter 400. This improves processing performance.

As an example, after determining that all data is received, the CPU core 430 on the network adapter 400 sends the I/O read complete message to the device simulation module 411 of the data plane offload engine 410. There is a plurality of specific implementations. The following describes several possible implementations in detail.

In a possible implementation, on the basis of the foregoing allocation of one I/O context, in addition to related information required for processing an I/O, an I/O context corresponding to each ID further records a complete stated of a message ID. The data plane offload engine 410 obtains an I/O context based on an I/O ID carried in a returned message, and sets a status of a corresponding message to a complete state based on the message ID. When statuses of all messages are set to the complete state, the CPU core 430 on the network adapter 400 directly sends the I/O read complete message to the device simulation module 411.

It should be understood that, after the I/O read is completed, the set corresponding I/O context becomes invalid, and the CPU may re-allocate the context.

In another possible implementation, on the basis of the foregoing allocation of one I/O context, in addition to related information required for processing an I/O, an I/O context corresponding to each ID further records an offset number of a data block. A returned message may carry an I/O ID and the offset number of the data block. The data plane offload engine 410 obtains the I/O ID, obtains the I/O context, and sets a completion flag of the corresponding data block based on the offset number of the data block. When all data is completed, the CPU core 430 on the network adapter 400 directly sends the I/O read complete message to the device simulation module 411.

The foregoing describes in detail the data processing method for the network adapter in embodiments of this application with reference to FIG. 1 to FIG. 12. The following describes in detail an apparatus embodiment of this application with reference to FIG. 13.

Figure 13:
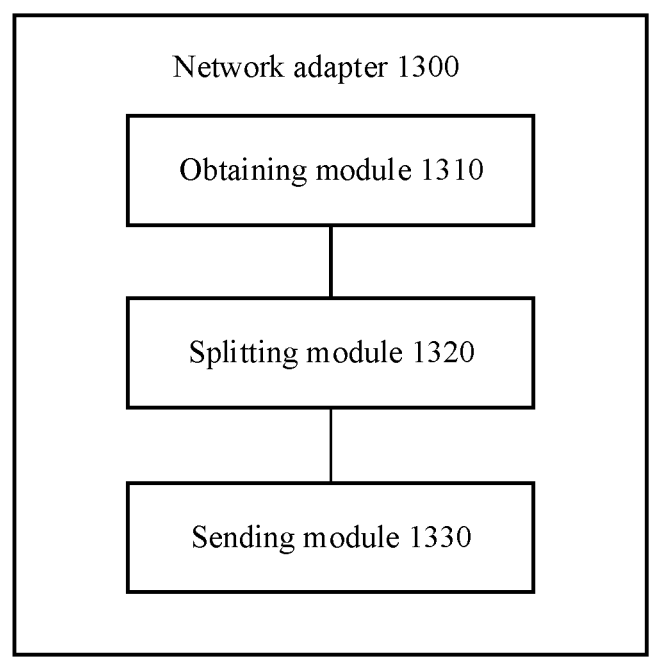
FIG. 13 is a schematic block diagram of a network adapter 1300 according to an embodiment of this application.

FIG. 13 is a schematic block diagram of a network adapter 1300 according to an embodiment of this application. The network adapter 1300 can perform the steps of the methods shown in FIG. 2, FIG. 5, and FIG. 9. To avoid repetition, details are not described herein again. The network adapter 1300 includes an obtaining module 1310, a splitting module 1320, and a sending module 1330.

The obtaining module 1310 is configured to obtain a first I/O command. The first I/O command instructs to write data stored in a local server to at least one remote server, and the first I/O command includes address information and length information that are of the data and that are stored in the local server.

The splitting module 1320 is configured to split the data based on the address information and the length information, to obtain a plurality of groups of address information and length information.

The sending module 1330 is further configured to obtain, from the local server based on the plurality of groups of address information and length information, data corresponding to the plurality of groups of address information and length information, and send the data to the at least one remote server.

Optionally, the obtaining module 1310 is further configured to obtain, from a first VM based on the plurality of groups of address information and length information and an identifier corresponding to the first VM that is in the local server and that delivers the first I/O command, the data corresponding to the plurality of groups of address information and length information.

Optionally, a memory on the network adapter does not store the data.

Optionally, the network adapter 1300 further includes a scheduling module 1340.

The obtaining module 1310 is further configured to receive a plurality of I/O commands.

The scheduling module 1340 is configured to select the first I/O command from the plurality of I/O commands based on a storage address at which the plurality of I/O commands are stored in the remote server and/or a VM that is in the local server and that delivers the plurality of I/O commands.

Optionally, the network adapter 1300 includes a hardware engine. The hardware engine is used to process a data plane. The hardware engine selects the first I/O command from the plurality of I/O commands based on the storage address at which the plurality of I/O commands are stored in the remote server and/or the VM that is in the local server and that delivers the plurality of I/O commands.

Optionally, the network adapter 1300 further includes a determining module 1350.

The determining module 1350 is configured to determine, based on context information of the first I/O command, whether the plurality of pieces of data are all written to the at least one remote server. The context information of the first I/O command includes a storage status of the plurality of pieces of data in the at least one remote server.

The sending module 1330 is further configured to, when the plurality of pieces of data are all written to the at least one remote server separately, send an I/O write complete message to the local server through an interface.

Optionally, the obtaining module 1310 is configured to obtain a second I/O command. The second I/O command instructs to store data in at least one remote server to a local server, and the second I/O command includes address information and length information that are of the data and that are written to the local server.

The splitting module 1320 is further configured to split the second I/O command based on the address information and the length information, to obtain a plurality of I/O read messages. Each of the plurality of I/O read messages includes information that is of each piece of the data and that is written to the local server.

The sending module 1330 is further configured to separately send the I/O read message to the at least one remote server.

In a possible implementation, the information that is of each piece of the data and that is written to the local server includes any one of the following: address information and length information that are of each piece of the data and that are written to the local server, address information and length information that are of each piece of the data and that are written to the local server and information about a VM that is in the local server and that delivers the second I/O command, or a first identifier ID and offset information that is of the data and that is written to the local server. The first ID is used to indicate the information about the VM that is in the local server and that delivers the second I/O command, and a plurality of groups of address information and length information that are of the data and that are written to the VM.

In another possible implementation, the network adapter 1300 further includes a storage module 1360.

The obtaining module 1310 is further configured to receive a first I/O read response message from the remote server. The first I/O read response message includes first data that the local server needs to obtain from the remote server.

The determining module 1350 is further configured to determine, based on the first I/O read response message, address information and length information that are of the first data and that are written to the local server.

The storage module 1360 is configured to store the first data in the local server based on the address information and the length information.

In another possible implementation, the first I/O read response message includes the first ID and offset information that is of the first data and that is written to the local server.

The determining module 1350 is further configured to determine, based on the first ID, the plurality of groups of address information and length information that are of the data and that are written to the VM.

The storage module 1360 is further configured to determine, from the plurality of groups of address information and length information based on the offset information, the address information and length information that are of the first data and that are written to the local server.

In another possible implementation, the first I/O read response message includes the address information and length information that are of the first data and that are written to the local server and the information about the VM that is in the local server and that delivers the second I/O command.

The determining module 1350 is further configured to determine, based on information included in the first I/O read response message, the address information and length information that are of the first data and that are written to the local server.

In another possible implementation, the determining module 1350 is further configured to determine that address information and length information included in the first I/O read response message fall within a permission table. The permission table includes a plurality of groups of address information and length information of written data in the local server.

The storage module 1360 is further configured to store the first data in the local server based on the address information and the length information included in the first I/O read response message.

In another possible implementation, the determining module 1350 is further configured to determine, based on context information of the second I/O command, whether the plurality of pieces of data are all written to the local server. The context information of the second I/O command includes a storage complete state of the plurality of pieces of data in the local server.

The sending module 1330 is further configured to, when the plurality of pieces of data are all written to the local server, send an I/O read complete message to the local server through an interface.

The modules in the foregoing examples may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

The network adapter 1300 herein may be embodied in a form of a function module.

The term "module" herein may be implemented in a form of software and/or hardware. This is not further limited.

For example, the "module" may be a software program, a hardware circuit, or a combination thereof that implements the foregoing functions. The hardware circuit may include an ASIC, an electronic circuit, a processor (for example, a shared processor, a dedicated processor, or a group processor) configured to execute one or more software or firmware programs and a memory, a combined logic circuit, and/or other suitable components that support the described functions.

An embodiment of this application further provides a chip. The chip obtains instructions and executes the instructions to implement the foregoing methods.

Optionally, in an implementation, the chip includes a processor and a data interface. The processor reads, through the data interface, instructions stored in a memory, to perform the foregoing methods.

Optionally, in an implementation, the chip may further include a memory. The memory stores instructions, a processor is configured to execute the instructions stored in the memory. When the instructions are executed, the processor is configured to perform the foregoing methods.

An embodiment of this application further provides a computer-readable storage medium. The computer-readable storage medium stores instructions. The instructions are used to implement the methods in the foregoing method embodiments.

An embodiment of this application further provides a computer program product including instructions. The instructions are used to implement the methods in the foregoing method embodiments.

For example, in an implementation, the processor may be a CPU, or the processor may be another general-purpose processor, a DSP, an ASIC, an FPGA or another programmable logic device, a discrete gate or transistor logic device, a discrete hardware component, or the like. The general-purpose processor may be a microprocessor, or the processor may be any conventional processor or the like.

In an example of implementation, the memory may be a volatile memory or a nonvolatile memory, or may include a volatile memory and a nonvolatile memory. The nonvolatile memory may be a ROM, a PROM, an EPROM, an EEPROM, or a flash memory. The volatile memory may be a RAM, and is used as an external cache. By using examples but not limitative descriptions, many forms of RAM may be used, for example, a SRAM, a DRAM, an SDRAM, a DDR SDRAM, an ESDRAM, an SLDRAM, and a DR RAM.

The term "and/or" in this specification describes only an association relationship between associated objects and represents that three relationships may exist. For example, A and/or B may represent the following three cases: only A exists, both A and B exist, and only B exists, where A and B may be singular or plural. In addition, the character "/" in this specification generally indicates an "or" relationship between associated objects, but may also indicate an "and/or" relationship. For details, refer to the context for understanding.

In this application, "a plurality of" means two or more than two. "At least one of the following items (pieces)" or a similar expression thereof means any combination of these items, including any combination of one item (piece) or a plurality of items (pieces). For example, at least one item (piece) of a, b, and c may indicate: a, b, c, a and b, a and c, b and c, or a, b, and c, where a, b, and c may be singular or plural.

Sequence numbers of the foregoing processes do not mean execution sequences in embodiments of this application. The execution sequences of the processes should be determined based on functions and internal logic of the processes, and should not be constructed as any limitation on the implementation processes of embodiments of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by a network adapter, wherein the method comprises:
   obtaining a first input/output (I/O) command instructing to write first data stored in a local server to at least one remote server, wherein the first I/O command comprises address information of the first data and length information of the first data;
   splitting, based on the address information and the length information, the first data to obtain a plurality of groups of address information and length information;
   obtaining, from the local server and based on the groups of address information and length information, second data corresponding to the groups of address information and length information; and
   sending the second data to the at least one remote server.

2. The method of claim 1, further comprising further obtaining, from a first virtual machine (VM) that is in the local server and that delivers the first I/O command and based on an identifier corresponding to the first VM, the second data.

3. The method of claim 1, further comprising not storing the second data in a memory on the network adapter.

4. The method of claim 1, further comprising:
   receiving a plurality of second I/O commands; and
   selecting, from the second I/O commands and based on a storage address at which the second I/O commands are stored in the remote server, the first I/O command.

5. The method of claim 4, further comprising further selecting, by a hardware engine in the network adapter, the first I/O command from the second I/O commands.

6. The method of claim 1, further comprising:
   determining, based on context information of the first I/O command, whether a plurality of pieces of the second data are all written to the at least one remote server, wherein the context information comprises a storage status of the pieces of the second data in the at least one remote server; and
   sending, to the local server through an interface, an I/O write complete message when the pieces of the second data are all written to the at least one remote server.

7. The method of claim 1, further comprising:
   receiving a plurality of second I/O commands; and
   selecting, from the second I/O commands and based on a storage address at which the second I/O commands are stored in a virtual machine (VM) that is in the local server and that delivers the second I/O commands, the first I/O command.

8. The computer program product of claim 7, wherein the instructions that when executed by the processor further cause the network adapter to:
   receive a plurality of second I/O commands; and
   select, from the second I/O commands and based on a storage address at which the second I/O commands are stored in the at least one server or a virtual machine (VM) that is in the local server and that delivers the second I/O commands, the first I/O command.

9. A network adapter comprising:
   a memory configured to store instructions; and
   a processor coupled to the memory and configured to execute the instructions to cause the network adapter to:
      obtain a first input/output (I/O) command instructing to write first data stored in a local server to at least one server, wherein the first I/O command comprises address information of the first data and length information of the first data;
      split, based on the address information and the length information, the first data to obtain a plurality of groups of address information and length information;
      obtain, from the local server based on the groups of address information and length information, second data corresponding to the groups of address information and length information; and
      send the second data to the at least one server.

10. The network adapter of claim 9, wherein a memory on the network adapter does not store the second data.

11. The network adapter of claim 9, wherein the processor is further configured to execute the instructions to cause the network adapter to further obtain, from a first virtual machine (VM) that is in the local server and that delivers the first I/O command and based on the groups of address information and length information and an identifier corresponding to the first VM, the second data.

12. The network adapter of claim 9, wherein the processor is further configured to execute the instructions to cause the network adapter to:

receive a plurality of second I/O commands; and select, from the second I/O commands and based on a storage address at which the second I/O commands are stored in the at least one server or a virtual machine (VM) that is in the local server and that delivers the second I/O commands, the first I/O command.

13. The network adapter of claim 12, further comprising a hardware engine coupled to the processor, wherein the processor is further configured to execute the instructions to cause the network adapter to select, using the hardware engine, the first I/O command.

14. The network adapter of claim 9, wherein the processor is further configured to execute the instructions to cause the network adapter to:

determine, based on context information of the first I/O command, whether a plurality of pieces of the second data are all written to the at least one server, wherein the context information comprises a storage status of the pieces of the second data in the at least one server; and send, to the local server through an interface, an I/O write complete message when the pieces of the second data are all written to the at least one server.

15. The network adapter of claim 9, wherein the processor is further configured to execute the instructions to cause the network adapter to:

receive a plurality of second I/O commands; and select, from the second I/O commands and based on a storage address at which the second I/O commands are stored in a virtual machine (VM) that is in the local server and that delivers the second I/O commands, the first I/O command.

16. A computer program product comprising instructions that are stored on a non-transitory computer readable medium and that when executed by a processor, causes a network adapter to:

obtain a first input/output (I/O) command instructing to write first data stored in a local server to at least one server, wherein the first I/O command comprises address information of the first data and length information of the first data;

split, based on the address information and the length information, the first data to obtain a plurality of groups of address information and length information;

obtain, from the local server based on the groups of address information and length information, second data corresponding to the groups of address information and length information; and send the second data to the at least one server.

17. The computer program product of claim 16, wherein a memory on the network adapter does not store the second data.

18. The computer program product of claim 16, wherein the instructions that when executed by the processor further cause the network adapter to further obtain, from a first virtual machine (VM) that is in the local server and that delivers the first I/O command and based on the groups of address information and length information and an identifier corresponding to the first VM, the second data.

19. The computer program product of claim 18, wherein the instructions that when executed by the processor further cause the network adapter to select, using a hardware engine coupled to the processor, the first I/O command.

20. The computer program product of claim 18, wherein the instructions that when executed by the processor further cause the network adapter to:

determine, based on context information of the first I/O command, whether a plurality of pieces of the second data are all written to the at least one server, wherein the context information comprises a storage status of the pieces of the second data in the at least one server; and send, to the local server through an interface, an I/O write complete message when the pieces of the second data are all written to the at least one server.

* * * * *